US012720570B2

(12) United States Patent
Lu et al.

(10) Patent No.: US 12,720,570 B2
(45) Date of Patent: Aug. 25, 2026

(54) METHOD FOR MONITORING PHYSICAL DOWNLINK CONTROL CHANNEL, APPARATUS, DEVICE, AND STORAGE MEDIUM

(71) Applicant: DATANG MOBILE COMMUNICATIONS EQUIPMENT CO., LTD., Beijing (CN)

(72) Inventors: Yiwen Lu, Beijing (CN); Qiuping Huang, Beijing (CN); Xin Su, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 311 days.

(21) Appl. No.: 18/560,471

(22) PCT Filed: Mar. 22, 2022

(86) PCT No.: PCT/CN2022/082301
§ 371 (c)(1),
(2) Date: Nov. 13, 2023

(87) PCT Pub. No.: WO2022/237326
PCT Pub. Date: Nov. 17, 2022

(65) Prior Publication Data

US 2024/0251424 A1 Jul. 25, 2024

(30) Foreign Application Priority Data

May 11, 2021 (CN) ........................ 202110514792.4

(51) Int. Cl.
*H04W 72/232* (2023.01)
*H04L 5/00* (2006.01)

(52) U.S. Cl.
CPC ......... *H04W 72/232* (2023.01); *H04L 5/0053* (2013.01)

(58) Field of Classification Search
CPC ......................... H04W 72/231; H04W 72/232; H04L 5/0053; H04L 1/0023
See application file for complete search history.

(56) References Cited

U.S. PATENT DOCUMENTS

2020/0229008 A1 7/2020 Islam et al.
2020/0413412 A1 12/2020 Kim et al.
2022/0174681 A1* 6/2022 Gao .................... H04W 72/563

FOREIGN PATENT DOCUMENTS

CN 111314035 A 6/2020
CN 111901876 A 11/2020
(Continued)

OTHER PUBLICATIONS

International Search Report and Written Opinion dated Jun. 10, 2022 issued in international patent application No. PCT/CN2022/082301.

(Continued)

*Primary Examiner* — Gbemileke J Onamuti
(74) *Attorney, Agent, or Firm* — Harness, Dickey & Pierce, P.L.C.

(57) ABSTRACT

A method for monitoring a physical downlink control channel (PDCCH) is performed by a terminal device. The method includes: determining a target monitoring mode of the PDCCH; and on the basis of the target monitoring mode, determining control resource sets to be monitored within an overlapping time domain corresponding to a plurality of monitoring occasions.

19 Claims, 10 Drawing Sheets sending indication information to a terminal device, in which the indication information is configured to indicate a target monitoring mode corresponding to a PDCCH to the terminal device, and the target monitoring mode is configured to determine CORESETs to be monitored within an overlapping time domain corresponding to a plurality of monitoring occasions

S171

(56) References Cited

FOREIGN PATENT DOCUMENTS

| | | | |
|---|---|---|---|
| CN | 112533235 | A | 3/2021 |
| CN | 113439472 | A | 9/2021 |
| EP | 4340488 | A1 | 3/2024 |
| WO | WO-2021051392 | A1 | 3/2021 |

OTHER PUBLICATIONS

Office Action dated Jul. 27, 2023 issued in Chinese patent application No. 202110514792.4.
"Discussion on enhancements on beam management for multi-TRP," 3GPP TSG RAN WG1#102-e, R1-2006260, e-Meeting, Aug. 17-28, 2020.
"Summary #2 of AI: 8.1.2.4 Enhancements on HST-SFN deployment," 3GPP TSG RAN WG1#106b-e, R1-2110496, e-Meeting, Oct. 11-19, 2021.
"Summary #4 of AI: 8.1.2.4 Enhancements on HST-SFN deployment," 3GPP TSG RAN WG1#104b-e, R1-2104068, e-Meeting, Apr. 12-20, 2021.
Search Report for European Application No. 22806296.4 date Oct. 4, 2024.
Office Action for Japanese Application No. 2023-570256 dated Nov. 25, 2024 and English translation.
R1-2102602 Enhancements for HST-SFN deployment_final.
R1-2103560 Discussion on MTRP for reliability.
R1-2102960 Xiaomi Enhancements on Multi-TRP for PDCCH PUCCH and PUSCH.
R1-2102510 Vivo Further discussion and evaluation on HST-SFN schemes.
NTT DOCOMO, Inc, "Discussion on HST-SFN deployment," 3GPP TSG RAN WG1 #104b-e, R1-2103563, Apr. 12, 2021.
Office Action for Korean Application No. 10-2023-7042372 dated Jan. 13, 2026.

* cited by examiner

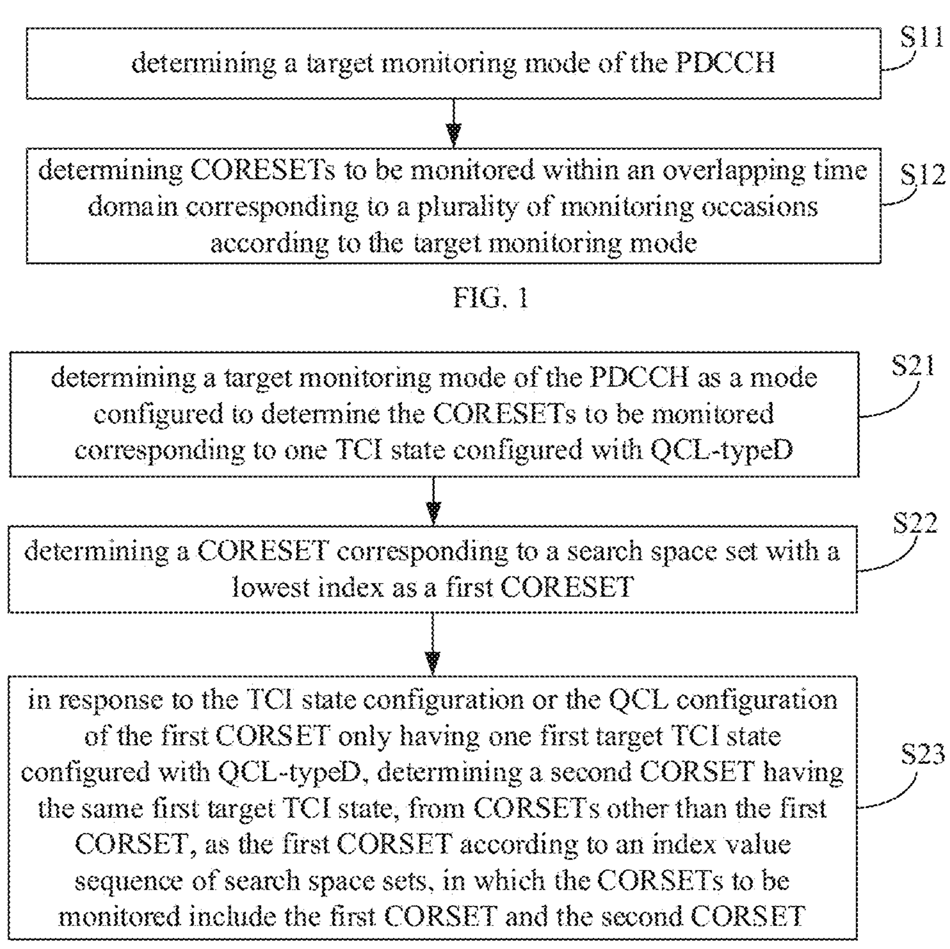
FIG. 1
FIG. 2
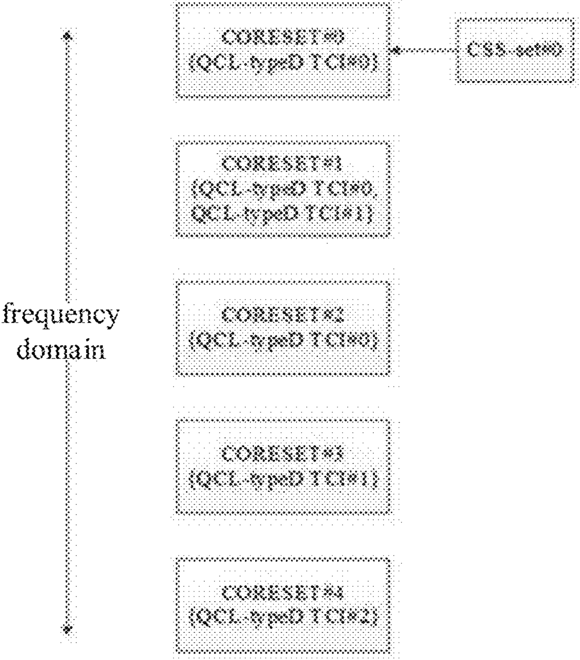
FIG. 3 frequency domain frequency domain frequency domain

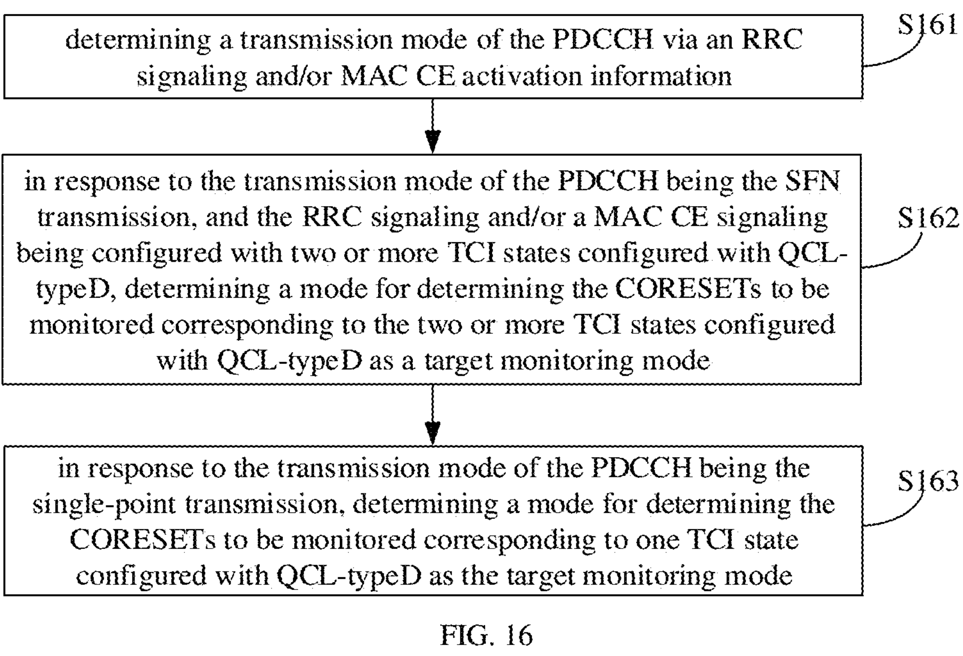

FIG. 16 sending indication information to a terminal device, in which the indication information is configured to indicate a target monitoring mode corresponding to a PDCCH to the terminal device, and the target monitoring mode is configured to determine CORESETs to be monitored within an overlapping time domain corresponding to a plurality of monitoring occasions

METHOD FOR MONITORING PHYSICAL DOWNLINK CONTROL CHANNEL, APPARATUS, DEVICE, AND STORAGE MEDIUM

CROSS-REFERENCE TO RELATED APPLICATIONS

This application is the U.S. national phase application of International Application No. PCT/CN2022/082301, filed on Mar. 22, 2022, which is based on and claims priority to Chinese Patent Application No. 202110514792.4, filed on May 11, 2021, the entire contents of which are incorporated herein by reference.

TECHNICAL FIELD

The present disclosure relates to a field of communication technologies, and specifically to a method and an apparatus for monitoring a physical downlink control channel (PDCCH).

BACKGROUND

When control-resource sets (CORESETs) of a single frequency network (SFN) overlaps at one symbol in a time domain within one frequency domain resource, each CORSET allows to be configured with two or more transmission configuration indicator (TCI) states, and corresponding CORESETs have two or more TCI states configured with a quasi co-Location typeD (QCL-typeD). For this situation, in the related art, only CORSETs with one TCI state configured with QCL-typeD may be monitored, so that a part of CORESETs of the SFN may not be monitored, and control information of a control channel may not be completely received and parsed, and there may even be demodulation failure of a data channel.

SUMMARY

According to a first aspect of the present disclosure, a method for monitoring a physical downlink control channel (PDCCH) is provided, and performed by a terminal device. The method includes:

determining a target monitoring mode of the PDCCH; and determining control-resource sets (CORESETs) to be monitored within an overlapping time domain corresponding to a plurality of monitoring occasions according to the target monitoring mode.

According to a second aspect of the present disclosure, a method for monitoring a PDCCH is provided, which is performed by a network device. The method includes:

sending indication information to a terminal device, in which the indication information is configured to indicate a target monitoring mode corresponding to a PDCCH to the terminal device, and the target monitoring mode is configured to determine CORESETs to be monitored within an overlapping time domain corresponding to a plurality of monitoring occasions.

According to a third aspect of the present disclosure, a terminal device is provided, and includes:

a memory configured to store a computer program, a transceiver configured to transmit and receive data under a control of a processor, and the processor configured to read the computer program stored in the memory and perform operations of:

determining a target monitoring mode of the PDCCH: and determining CORESETs to be monitored within an overlapping time domain corresponding to a plurality of monitoring occasions according to the target monitoring mode.

It should be understood that, the content described in the section is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

FIG. 1 is a flowchart illustrating a method for monitoring a physical downlink control channel (PDCCH) according to an embodiment of the present disclosure;

FIG. 2 is a flowchart illustrating a method for monitoring a PDCCH according to another embodiment of the present disclosure;

FIG. 3 is a diagram illustrating a method for monitoring a PDCCH according to another embodiment of the present disclosure;

FIG. 16 is a flowchart illustrating a method for monitoring a PDCCH according to another embodiment of the present disclosure.

FIG. 17 is a flowchart illustrating a method for monitoring a PDCCH according to another embodiment of the present disclosure.

DETAILED DESCRIPTION

Figure 4:
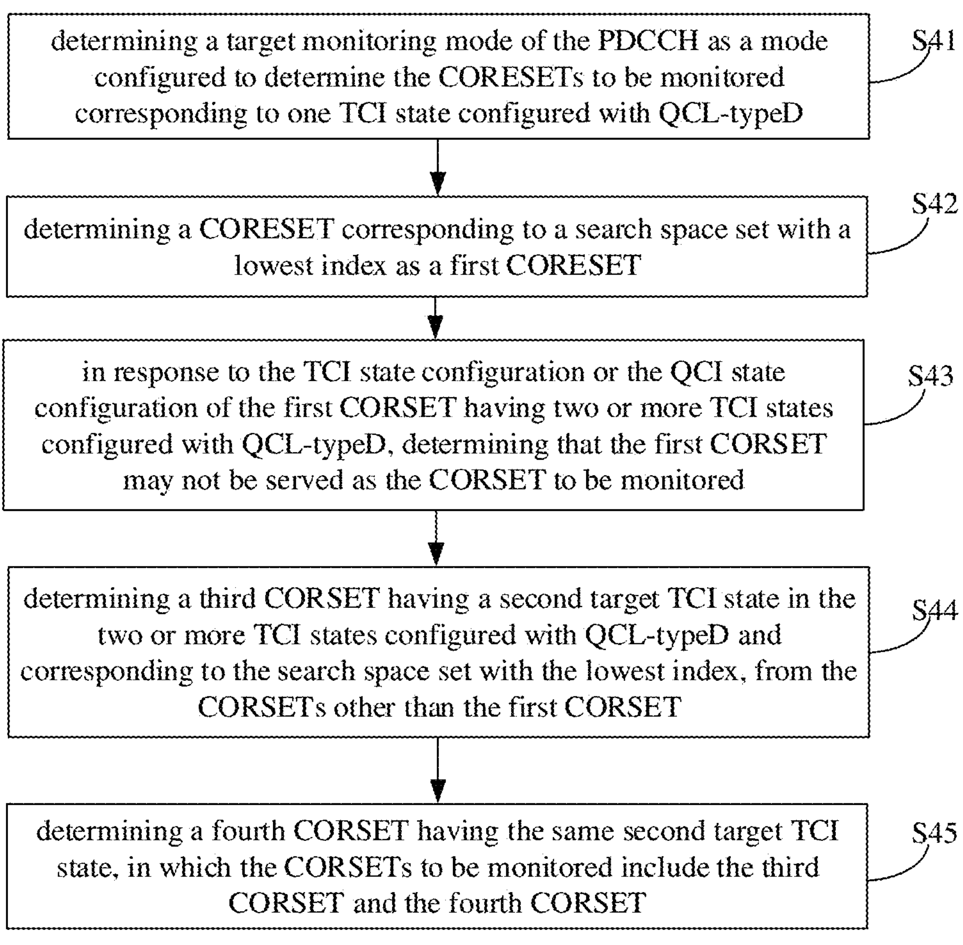
FIG. 4 is a flowchart illustrating a method for monitoring a PDCCH according to another embodiment of the present disclosure.

In the embodiments of the disclosure, the term "and/or", describes a relationship of the association objects, indicating that there may be three relationships, for example, A and/or B, may represent: any of existing A only, existing both A and B, or existing B only. The character "/" generally means the contextual object is in a "or" relationship.

The term "a plurality of" in the embodiments of the present disclosure means two or above, which is similar to other quantifiers.

The technical solution in the embodiments of the present disclosure may be described clearly and completely in combination with accompanying drawings in the embodiments of the present disclosure. The embodiments described are only a part of embodiments in the present disclosure, rather than all the embodiments.

FIG. 1 is a flowchart illustrating a method for monitoring a physical downlink control channel (PDCCH) in an embodiment of the present disclosure. As illustrated in FIG. 1, the method is performed by a terminal device, and includes the following steps S11 to S12.

At S11, a target monitoring mode of the PDCCH is determined.

In the embodiments of the disclosure, the target monitoring mode of the PDCCH is one of:

- a mode configured to determine the CORESETs to be monitored corresponding to one TCI state configured with QCL-typeD, which may be referred to as the target monitoring mode 1; and
- a mode configured to determine the CORESETs to be monitored corresponding to two or more TCI states configured with QCL-typeD, which may be referred to as the target monitoring mode 2.

In some embodiments, the terminal device may receive transmission configuration information of an SFN transmission of the PDCCH sent by the network device. The transmission configuration information includes a first RRC configuration parameter. The terminal device may determine a transmission mode of the PDCCH according to the first RRC configuration parameter in the transmission configuration information.

Optionally, when the terminal device does not receive the first RRC configuration parameter, such as EnableTwoQCL-typeD, in the SFN transmission configuration information, the CORESETs to be monitored corresponding to one TCI state configured with QCL-typeD may be determined according to the target monitoring mode 1.

Optionally, when the terminal device receives the first RRC configuration parameter, such as EnableTwoQCL-typeD, for monitoring two TCI states configured with QCL-typeD within a symbol, the CORESETs to be monitored corresponding to two TCI states configured with QCL-typeD may be determined according to the target monitoring mode 2.

In some embodiments, the terminal device may send a TCI-states monitoring capability within the overlapping time domain corresponding to the plurality of monitoring occasions of the terminal device to the network device. The TCI-states monitoring capability is configured to indicate whether the terminal device has a capability for monitoring a CORSET having a plurality of TCI states configured with QCL-typeD. When the network device receives the TCI-states monitoring capability, and the terminal device has the capability for monitoring a CORSET having the plurality of TCI states configured with QCL-typeD, the network device sends a second RRC configuration parameter for indicating to monitor a TCI state configured with QCL-typeD to the terminal device. Correspondingly, the terminal device may receive the second RRC configuration parameter sent by the network device, and determine the target monitoring mode according to the second RRC configuration parameter. Optionally, when the terminal device does not receive the second RRC configuration parameter such as SDMscheme1, or SDMscheme1forPDCCH, for indicating to monitor two or more TCI states configured with QCL-typeD within a symbol, the CORESETs to be monitored corresponding to one TCI state configured with QCL-typeD may be determined according to the target monitoring mode 1.

In the embodiments of the disclosure, a monitoring occasion refers to a monitoring duration for a period of time. Therefore, there may be an overlapping part among a plurality of monitoring occasions in the time domain, which is an overlapping time domain corresponding to the monitoring occasions. For example, the PDCCH monitors symbols 1-2 in one monitoring occasion and symbols 2-3 in another monitoring occasion. In this case, the above two monitoring occasions overlaps in the symbol 2.

Optionally, when the terminal device receives the second RRC configuration parameter, such as SDMscheme1, or SDMscheme1forPDCCH, that monitors the two or more TCI states configured with QCL-typeD within a symbol, the CORESETs to be monitored corresponding to the two or more TCI states configured with QCL-typeD may be determined according to the target monitoring mode 2.

In some embodiments, the terminal device may determine the target monitoring mode of the PDCCH according to the TCI-states monitoring capability within the overlapping time domain corresponding to the plurality of monitoring occasions of the terminal device.

Optionally, when the terminal device does not have the capability for monitoring the two or more TCI states configured with QCL-typeD, the CORESETs to be monitored corresponding to one TCI state configured with QCL-typeD may be determined according to the target monitoring mode 1.

Optionally, when the terminal device has the capability for monitoring two or more TCI states configured with QCL-typeD, the CORESETs to be monitored corresponding to the two or more TCI states configured with QCL-typeD may be determined according to the target monitoring mode 2.

At S12, CORESETs to be monitored within an overlapping time domain corresponding to a plurality of monitoring occasions are determined according to the target monitoring mode.

A first CORESET is determined according to the target monitoring mode, and the CORESETs to be monitored are determined according to a TCI state configuration or a quasi co-location (QCL) configuration of the first CORESET.

In some embodiments, a CORESET corresponding to a search space-set (SS-set) with a lowest index is determined as the first CORESET.

In some embodiments, a CORESET having two or more TCI states configured with QCL-typeD and corresponding to the SS set with the lowest index, is determined from the CORESETs, as the first CORESET.

Optionally, in a process of determining the first CORSET according to the corresponding SS-set with the lowest index, the terminal device finds the first CORESET preferentially according to a lowest index of a common search space set (CSS-set), and in response to the first CORESET being not found according to the lowest index of the CSS-set, the terminal device finds the first CORESET according to the lowest index of a user search space-set (USS-set).

In the embodiments of the disclosure, the target monitoring mode of the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

FIG. 2 is a flowchart illustrating a method for monitoring a PDCCH according to an embodiment of the disclosure. The method is performed by a terminal device. As illustrated in FIG. 2, the method includes the following steps S21 to S22.

At S21, a target monitoring mode of the PDCCH is determined as a mode configured to determine the CORESETs to be monitored corresponding to one TCI state configured with QCL-typeD.

In some embodiments, the terminal device may receive transmission configuration information of an SFN transmission of a PDCCH sent by the network device. The transmission configuration information includes a first RRC configuration parameter. The terminal device may determine a transmission mode of the PDCCH according to the first RRC configuration parameter in the transmission configuration information. Optionally, when the terminal device does not receive the first RRC configuration parameter, such as EnableTwoQCLtypeD, in the SFN transmission configuration information, the CORESETs to be monitored corresponding to one TCI state configured with QCL-typeD may be determined according to the target monitoring mode 1.

In some embodiments, the terminal device may send to the network device a TCI-states monitoring capability within the overlapping time domain corresponding to the plurality of monitoring occasions of the terminal device itself. The TCI-states monitoring capability is configured to indicate whether the terminal device has a capability for monitoring a CORSET having a plurality of TCI states configured with QCL-typeD. When the network device receives the TCI-states monitoring capability, and the terminal device has the capability for monitoring the CORSET having the plurality of TCI states configured with QCL-typeD, the network device sends to the terminal device a second RRC configuration parameter for indicating to monitor a TCI state configured with QCL-typeD. Correspondingly, and the terminal device may receive the second RRC configuration parameter sent by the network device, and determine the target monitoring mode according to the second RRC configuration parameter.

Optionally, when the terminal device does not receive the second RRC configuration parameter for indicating to monitor two or more TCI states configured with QCL-typeD within a symbol, such as SDMscheme1, or SDMscheme1forPDCCH, the CORESETs to be monitored corresponding to one TCI state configured with QCL-typeD may be determined according to the target monitoring mode 1.

In some embodiments, the terminal device may determine the target monitoring mode of the PDCCH according to the TCI-states monitoring capability within the overlapping time domain corresponding to the plurality of monitoring occasions of the terminal device.

Optionally, when the terminal device does not have the capability for monitoring the two or more TCI states configured with QCL-typeD, the CORESETs to be monitored corresponding to one TCI state configured with QCL-typeD may be determined according to the target monitoring mode 1.

At S22, a CORESET corresponding to a SS-set with a lowest index is determined as a first CORESET.

The terminal device determines the first CORESET preferentially corresponding to a CSS-set with a lowest index; if the CSS-set does not have a corresponding first CORSET, a first CORSET corresponding to a USS-set with the lowest index is determined. The method for monitoring a PDCCH according to the embodiments of the disclosure is explained in combination with FIG. 3, in which the terminal device determines the first CORSET corresponding to the CSS-set with the lowest index preferentially as a CORESET #0.

At S23, in response to the TCI state configuration or the QCL configuration of the first CORSET only having one first target TCI state configured with QCL-typeD, a second CORSET having the same first target TCI state is determined from CORSETs other than the first CORSET, as the first CORSET, according to an index value sequence of SS sets. The CORSETs to be monitored include the first CORSET and the second CORSET.

Continuing with FIG. 3 as an example, the TCI state configuration or the QCL configuration of the CORSET #0 only includes one TCI #0 configured with QCL-typeD. The TCI #0 configured with QCL-typeD is the first target TCI state. Further, the terminal device determines a second CORSET having the same TCI #0 as the CORSET #0 from CORSETs other than the first CORSET, and the second CORSET may be correspondingly monitored, that is, the CORSETs to be monitored include the first CORSET and the second CORSET. As illustrated in FIG. 3, a CORSET #2 is the second CORSET, both the CORESET #0 and the CORESET #2 may be monitored by the terminal device simultaneously.

In the embodiments of the disclosure, the target monitoring mode of the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

FIG. 4 is a flowchart illustrating a method for monitoring a PDCCH according to an embodiment of the disclosure. The method is performed by a terminal device. As illustrated in FIG. 4, the method includes the following steps S41 to S45.

At S41, a target monitoring mode of the PDCCH is determined as a mode configured to determine the CORESETs to be monitored corresponding to one TCI state configured with QCL-typeD.

At 42, a CORESET corresponding to a SS-set with a lowest index is determined as a first CORESET.

The descriptions of steps S41 to S42 may refer to a record of relevant contents in the above embodiments, which will not be repeated here.

At S43, in response to the TCI state configuration or the QCI state configuration of the first CORSET having two or more TCI states configured with QCL-typeD, it is determined that the first CORSET may not be served as the CORSET to be monitored.

The first CORSET corresponding to the SS-set with the lowest index is assumed to be CORESET #A. The TCI state configuration or the QCI information of the CORESET #A includes two or more TCI states configured with QCL-typeD, in which case, since the target monitoring mode of the PDCCH determined by the terminal device is the target monitoring mode 1, the CORESET #A may not be monitored by the terminal device.

At S44, a third CORSET having a second target TCI state in two or more TCI states configured with QCL-typeD and corresponding to the SS set with the lowest index, is determined from the CORSETs other than first CORSET.

In order to determine the CORSETs to be monitored, the terminal device continues to reselect the third CORSET from the CORSETs other than the first CORSET. Optionally, one TCI state in the two or more TCI states configured with QCL-typeD in the first CORSET is determined as the second target TCI state. Optionally, a minimum TCI state in the two or more TCI states configured with QCL-typeD may be agreed as the second target TCI state, or a maximum TCI state in the two or more TCI states configured with QCL-typeD may be agreed as the second target TCI state, or one TCI state specified by the network device via a signaling may be agreed as the second target TCI state.

Further, the terminal device determines, from the CORSETs other than the first CORSET, the third CORSET having the second target TCI state and corresponding to the SS-set with a lowest index.

For example, the TCI state configuration or the QCI information of the CORESET #A includes two or more TCI states configured with QCL-typeD, such as TCI #0 and TCI #1, in which case, the CORESET #A may not be monitored by the terminal device. Optionally, the TCI #0 may be determined as the second target TCI state, and a third CORSET (i.e., CORSET #B) having the TCI #0 and corresponding to the SS-set with a lowest index may be redetermined from the CORSETs other than the first CORSET.

At S45, a fourth CORSET having the same second target TCI state is determined. The CORSETs to be monitored include the third CORSET and the fourth CORSET.

Figure 5:
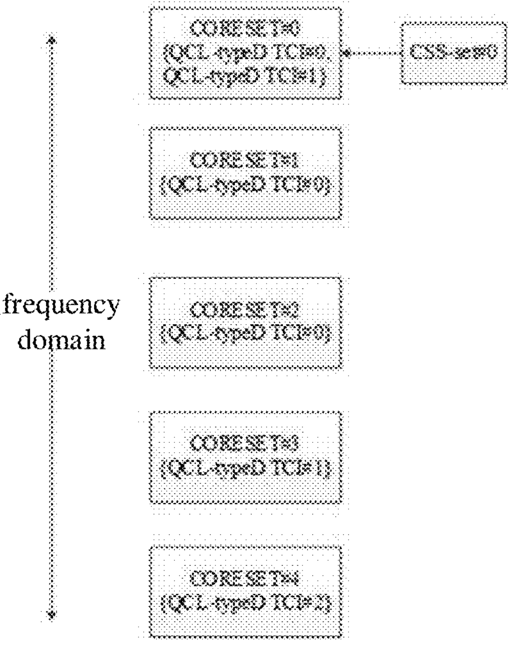
FIG. 5 is a diagram illustrating a method for monitoring a PDCCH according to another embodiment of the present disclosure.

The method for monitoring a PDCCH according to the embodiments of the disclosure is explained in combination with FIG. 5. The terminal device determines the first CORSET corresponding to the CSS-set or the USS-set with the lowest index preferentially as CORESET #0. The TCI configuration information of the CORESET #0 is that the TCI states configured with QCL-typeD include the TCI #0 and the TCI #1. Since the target monitoring mode of the PDCCH determined by the terminal device is the target monitoring mode 1, the CORESET #0 may not be monitored by the terminal device.

Further, taking the TCI #0 from TCI #0 and TCI #1 in the CORESET #0 as the second target TCI state, the terminal device determines CORESET #1 only having one TCI #0 configured with QCL-typeD and corresponding to the CSS-set with the lowest index preferentially. In this case, if the CSS-set with the lowest index does not correspond to the CORESET #1, the terminal device further determines CORESET #1 only having one TCI #0 configured with QCL-typeD and corresponding to the USS-set with the lowest index. If there are other CORSETs having the same TCI #0 configured with QCL-typeD within the current symbol, the terminal device may monitor the other CORSETs. The CORESET #1 and the CORESET #2 in FIG. 5 may be monitored by the terminal device simultaneously.

In the embodiments of the disclosure, the target monitoring mode of the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

Figures 6, 7:
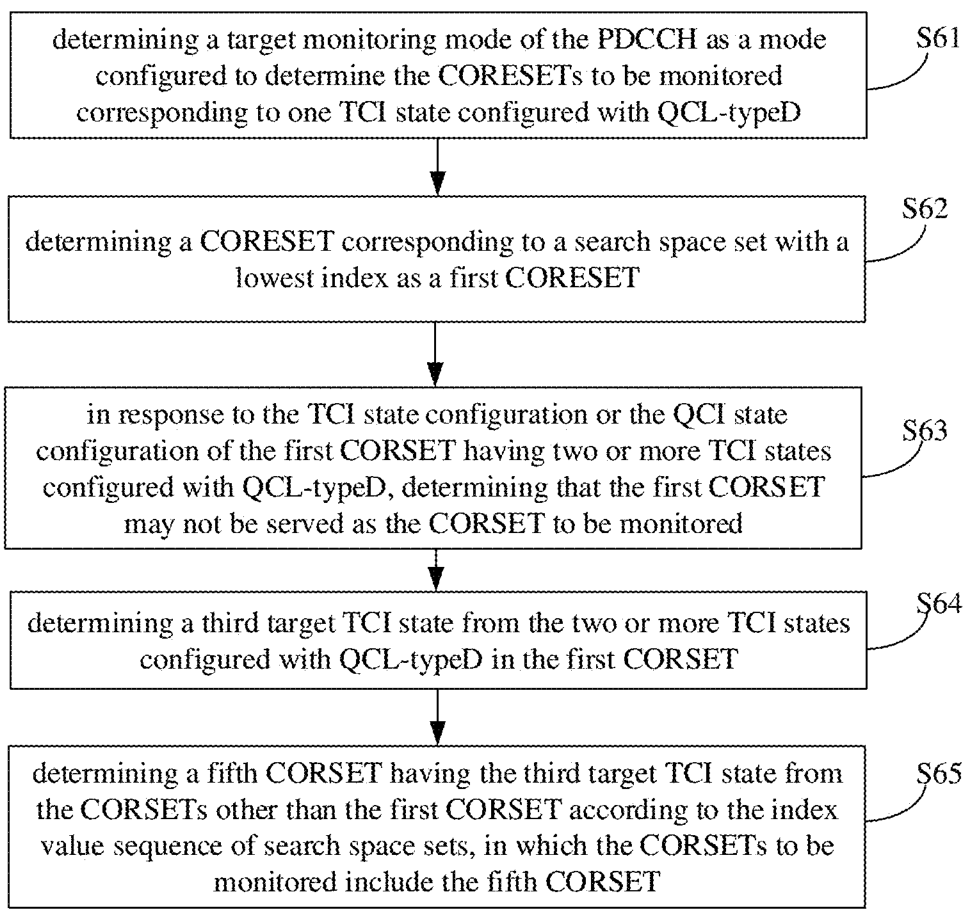
FIG. 6 is a flowchart illustrating a method for monitoring a PDCCH according to another embodiment of the present disclosure.
FIG. 7 is a diagram illustrating a method for monitoring a PDCCH according to another embodiment of the present disclosure.

FIG. 6 is a flowchart illustrating a method for monitoring a PDCCH according to an embodiment of the disclosure. The method is performed by a terminal device. As illustrated in FIG. 6, the method includes the following steps S61 to S65.

At S61, a target monitoring mode of the PDCCH is determined as a mode configured to determine the CORESETs to be monitored corresponding to one TCI state configured with QCL-typeD.

At 62, a CORESET corresponding to a SS-set with a lowest index is determined as a first CORESET.

At S63, in response to the TCI state configuration or the QCI state configuration of the first CORSET having two or more TCI states configured with QCL-typeD, it is determined that the first CORSET may not be served as the CORSET to be monitored.

The descriptions of steps S61 to S63 may refer to a record of relevant contents in the above embodiments, which will not be repeated here.

At S64, a third target TCI state is determined from the two or more TCI states configured with QCL-typeD in the first CORSET.

At S65, a fifth CORSET having the third target TCI state is determined from the CORSETs other than the first CORSET according to the index value sequence of the SS sets. The CORSETs to be monitored include the fifth CORSET.

The method for monitoring a PDCCH in an embodiment of the present disclosure is described in combination with FIG. 7. The terminal device determines the first CORSET corresponding to the CSS-set or the USS-set with the lowest index preferentially as CORESET #0. The TCI configuration information of the CORESET #0 is that the TCI states configured with QCL-typeD include TCI #0 and TCI #1. Since the target monitoring mode of the PDCCH determined by the terminal device is the target monitoring mode 1, the CORESET #0 may not be monitored by the terminal device.

Further, taking TCI #0 from TCI #0 and TCI #1 in the CORESET #0 as third target TCI states, the terminal device determines CORESET #1 corresponding to the CSS-set or the USS-set with the lowest index preferentially. In this case, if there is only the TCI #0 configured with QCL-typeD of the CORSET #1 corresponding to the lowest index within the current symbol, the other CORSETs may be monitored. The CORESET #1 and the CORESET #2 in FIG. 7 may be monitored by the terminal device simultaneously.

In the embodiments of the disclosure, the target monitoring mode of the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

Figures 8, 9:
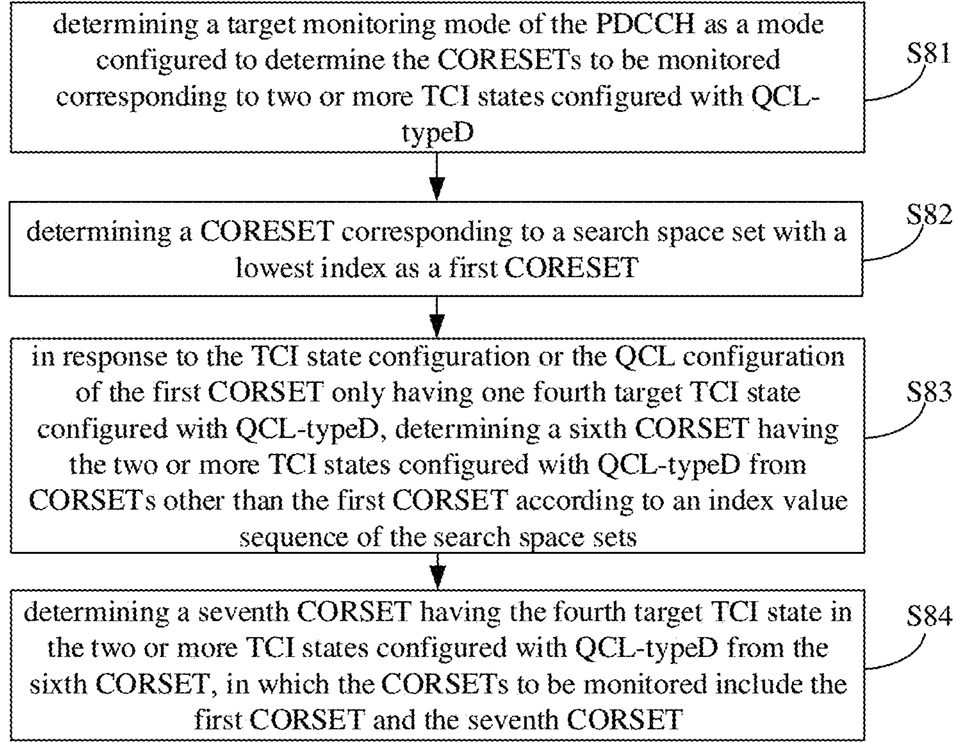
FIG. 8 is a flowchart illustrating a method for monitoring a PDCCH according to another embodiment of the present disclosure.
FIG. 9 is a diagram illustrating a method for monitoring a PDCCH according to another embodiment of the present disclosure.

FIG. 8 is a flowchart illustrating a method for monitoring a PDCCH according to an embodiment of the disclosure. The method is performed by a terminal device. As illustrated in FIG. 8, the method includes the following steps S81 to S84.

At S81, a target monitoring mode of the PDCCH is determined as a mode configured to determine the CORESETs to be monitored corresponding to two or more TCI states configured with QCL-typeD.

In some embodiments, the terminal device may receive transmission configuration information of an SFN transmission of a PDCCH sent by the network device. The transmission configuration information includes a first RRC configuration parameter. The terminal device may determine a transmission mode of the PDCCH according to the first RRC configuration parameter in the transmission configuration information.

Optionally, when the terminal device receives the first RRC configuration parameter, such as EnableTwoQCL-typeD, for monitoring two TCI states configured with QCL-typeD, the CORESETs to be monitored corresponding to the two TCI states configured with QCL-typeD may be determined according to the target monitoring mode 2.

In some embodiments, the terminal device may send a TCI-states monitoring capability within the overlapping time domain corresponding to the plurality of monitoring occasions of the terminal device to the network device. The TCI-states monitoring capability is configured to indicate whether the terminal device has the capability for monitoring a CORSET having a plurality of TCI states configured with QCL-typeD. When the network device receives the TCI-states monitoring capability, and the terminal device has a capability for monitoring a CORSET having the plurality of TCI states configured with QCL-typeD, the network device sends a second RRC configuration parameter for indicating to monitor a TCI state configured with QCL-typeD to the terminal device. Correspondingly, the terminal device may receive the second RRC configuration parameter sent by the network device, and determine the target monitoring mode according to the second RRC configuration parameter.

Optionally, when the terminal device receives the second RRC configuration parameter monitoring the two or more TCI states configured with QCL-typeD within a symbol, such as SDMscheme1 or SDMscheme1forPDCCH, the CORESETs to be monitored corresponding to the two or more TCI states configured with QCL-typeD may be determined according to the target monitoring mode 2.

In some embodiments, the terminal device may determine the target monitoring mode of the PDCCH according to the TCI-states monitoring capability within the overlapping time domain corresponding to the plurality of monitoring occasions of the terminal device itself.

Optionally, when the terminal device has the capability for monitoring two or more TCI states configured with QCL-typeD, the CORESETs to be monitored corresponding to the two or more TCI states configured with QCL-typeD may be determined according to the target monitoring mode 2.

At 82, a CORESET corresponding to a SS-set with a lowest index is determined as a first CORESET.

The terminal device determines the first CORESET preferentially corresponding to a CSS-set with a lowest index; and if the CSS-set does not have a corresponding first CORSET, a first CORSET corresponding to a USS-set with the lowest index is determined.

At S83, in response to the TCI state configuration or the QCL configuration of the first CORSET only having one fourth target TCI state configured with QCL-typeD, a sixth CORSET having the two or more TCI states configured with QCL-typeD is determined from CORSETs other than the first CORSET according to an index value sequence of SS-sets.

At 84, a seventh CORSET having the fourth target TCI state in the two or more TCI states configured with QCL-typeD is determined from the sixth CORSET. The CORSETs to be monitored include the first CORSET and the seventh CORSET.

The method for monitoring a PDCCH in an embodiment of the present disclosure is described in combination with FIG. 9. The terminal device determines the first CORSET corresponding to the of the CSS-set or the USS-set with the lowest index preferentially as CORESET #0. In the example, the TCI state configuration or the QCI configuration in the CORSET #0 only includes one TCI #0 configured with QCL-typeD. When the target monitoring mode of the PDCCH determined by the terminal device is the target monitoring mode 2, the CORESET #0 may be monitored by the terminal device.

Further, the terminal device preferentially determines a CORESET having TCI states configured with QCL-typeD include TCI #0 and TCI #1 and corresponding to the CSS-set or the USS-set with the lowest index. Further, the TCI #0 in the CORESET #0 is used as the fourth target TCI state, and a CORSET having the same TCI #0 configured with QCL-typeD in the two or more TCI states configured with QCL-typeD within the current symbol may be also monitored. Therefore, the CORESET #0, the CORESET #1 and the CORESET #3 in FIG. 7 may be monitored by the terminal device simultaneously.

In the embodiments of the disclosure, the target monitoring mode of the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

Figure 10:
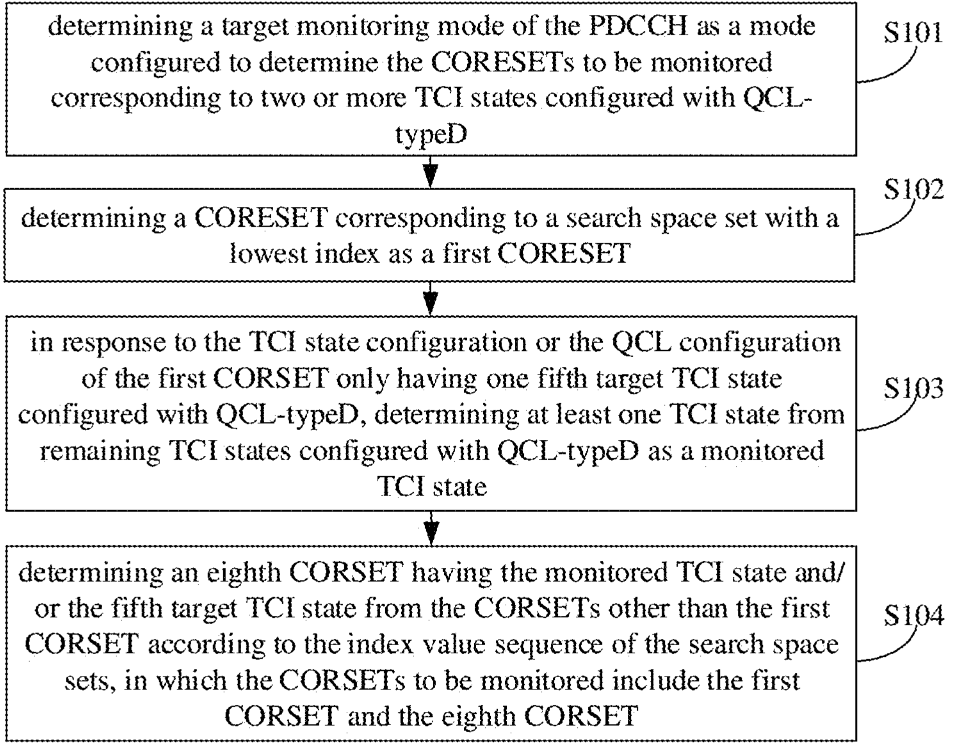
FIG. 10 is a flowchart illustrating a method for monitoring a PDCCH according to another embodiment of the present disclosure.

FIG. 10 is a flowchart illustrating a method for monitoring a PDCCH according to an embodiment of the disclosure. The method is performed by a terminal device. As illustrated in FIG. 10, the method includes the following steps S101 to S104.

At S101, a target monitoring mode of the PDCCH is determined as a mode configured to determine the CORESETs to be monitored corresponding to two or more TCI states configured with QCL-typeD.

At S102, a CORESET corresponding to a SS-set with a lowest index is determined as a first CORESET.

The descriptions of steps S101 to 102 may refer to a record of relevant contents in the above embodiments, which will not be repeated here.

At S103, in response to the TCI state configuration or the QCL configuration of the first CORSET only having one fifth target TCI state configured with QCL-typeD, at least one TCI state is determined from remaining TCI states configured with QCL-typeD as a monitored TCI state.

At S104, an eighth CORSET having the monitored TCI state and/or the fifth target TCI state is determined from the CORSETs other than the first CORSET according to the index value sequence of the SS-sets. The CORSETs to be monitored include the first CORSET and the eighth CORSET.

Figure 11:
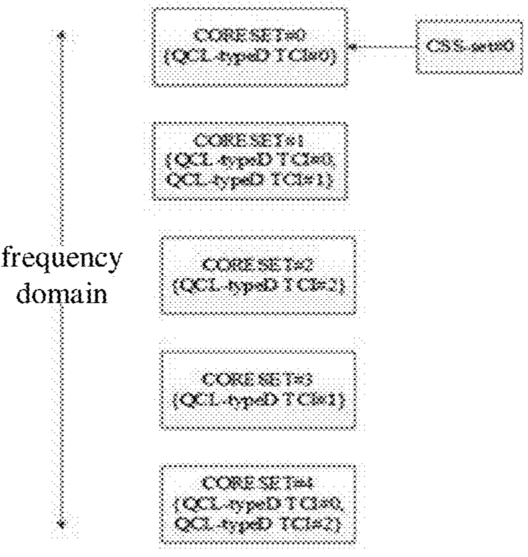
FIG. 11 is a diagram illustrating a method for monitoring a PDCCH according to another embodiment of the present disclosure.

The method for monitoring a PDCCH in an embodiment of the present disclosure is described in combination with FIG. 11. The terminal device determines the first CORSET corresponding to the CSS-set or the USS-set with the lowest index preferentially as CORESET #0. The TCI state configuration or the QCI configuration in the CORSET #0 only includes one TCI #0 configured with QCL-typeD. Since the target monitoring mode of the PDCCH determined by the terminal device is the target monitoring mode 2, the CORESET #0 may be monitored by the terminal device.

Further, the TCI #0 in the CORESET #0 is taken as the fifth target TCI state. The terminal device determines a TCI state configured with QCL-typeD corresponding to the CSS-set or the USS-set with the lowest index preferentially, and determines at least one of the two or more TCI states configured with QCL-typeD as the monitored TCI state. As illustrated in FIG. 11, TCI #2 may be selected as the monitored TCI state. The terminal device determines that other CORSETs having the same TCI #0 configured with QCL-typeD and/or the same TCI #2 configured with QCL-typeD may be monitored within the current symbol from the CORSETs other than the first CORSET. That is, when TCIs of other CORSETs are the same as the TCI #0 and the TCI #2 of the CORESET #0, or TCIs of other CORSETs are a TCI subset of the CORESET #0, the other CORSETs may be monitored. Therefore, the CORESET #0, the CORESET #2 and the CORESET #4 in FIG. 11 may be monitored by the terminal device simultaneously.

Figures 12, 13:
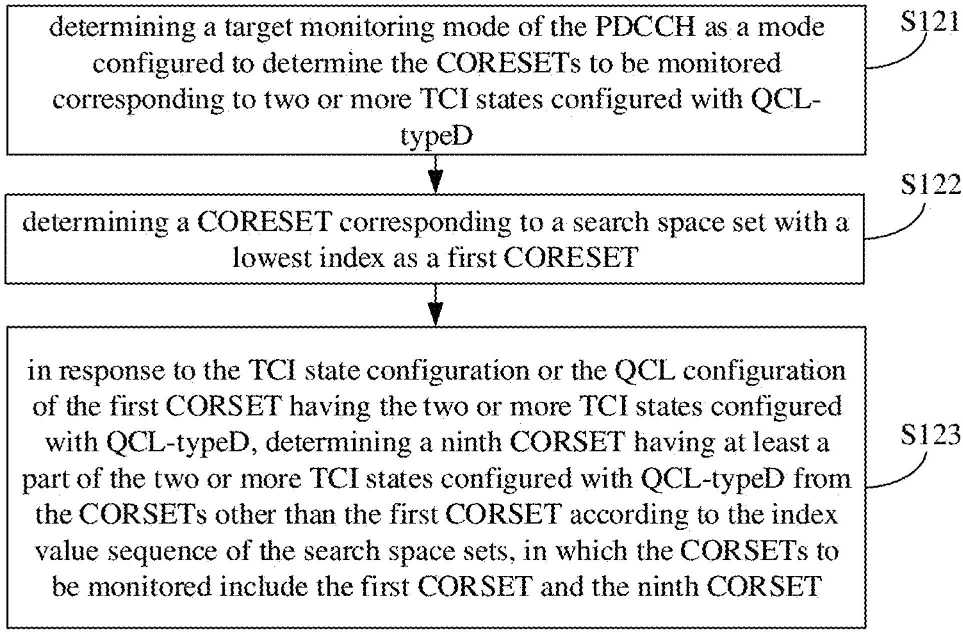
FIG. 12 is a flowchart illustrating a method for monitoring a PDCCH according to another embodiment of the present disclosure.
FIG. 13 is a diagram illustrating a method for monitoring a PDCCH according to another embodiment of the present disclosure.

FIG. 12 is a flowchart illustrating a method for monitoring a PDCCH according to an embodiment of the disclosure. The method for monitoring a PDCCH is performed by a terminal device. As illustrated in FIG. 12, the method includes the following steps S121 to S123.

At S121, a target monitoring mode of the PDCCH is determined as a mode configured to determine the CORESETs to be monitored corresponding to two or more TCI states configured with QCL-typeD.

At 122, a CORESET corresponding to a SS-set with a lowest index is determined as a first CORESET.

The descriptions of steps S121 to 122 may refer to a record of relevant contents in the above embodiments, which will not be repeated here.

At S123, in response to the TCI state configuration or the QCL configuration of the first CORSET having the two or more TCI states configured with QCL-typeD, a ninth CORSET having at least a part of the two or more TCI states configured with QCL-typeD is determined from the CORSETs other than the first CORSET according to the index value sequence of the SS sets. The CORSETs to be monitored include the first CORSET and the ninth CORSET.

The method for monitoring a PDCCH in an embodiment of the present disclosure is described in combination with FIG. 13. The terminal device determines the first CORSET corresponding to the CSS-set or the USS-set with the lowest index preferentially as CORESET #0. The TCI configuration information of the CORESET #0 is that the TCI states configured with QCL-typeD include TCI #0 and TCI #1. Since the target monitoring mode of the PDCCH determined by the terminal device is the target monitoring mode 2, the CORESET #0 may be monitored by the terminal device.

Further, the CORSET #0 includes the TCI #0 and the TCI #1. When there are other CORSETs having the same TCI #0 configured with QCL-typeD or the TCI #1 configured with QCL-typeD within the current symbol, the other CORSETs may be monitored, and a TCI subset of the CORSET #0 may be monitored. Therefore, the CORESET #0, the CORESET #1, the CORESET #2, and the CORESET #3 in FIG. 13 may be monitored by the terminal device simultaneously.

In the embodiments of the disclosure, the target monitoring mode of the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

Figure 14:
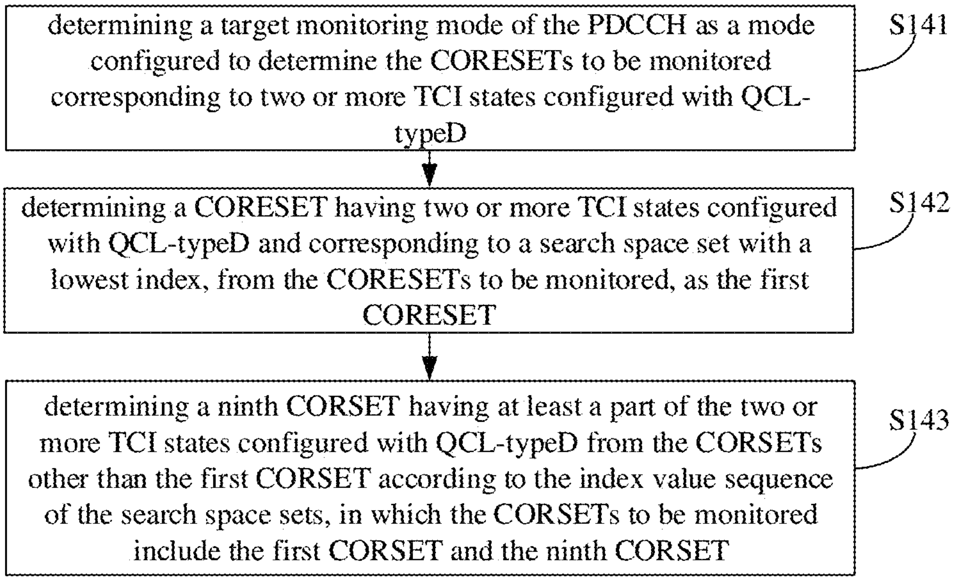
FIG. 14 is a flowchart illustrating a method for monitoring a PDCCH according to another embodiment of the present disclosure.

FIG. 14 is a flowchart illustrating a method for monitoring a PDCCH according to an embodiment of the disclosure. The method for monitoring a PDCCH is performed by a terminal device. As illustrated in FIG. 14, the method includes the following steps S141 to S143.

At S141, a target monitoring mode of the PDCCH is determined as a mode configured to determine the CORESETs to be monitored corresponding to two or more TCI states configured with QCL-typeD.

The descriptions of step S141 may refer to a record of relevant contents in the above embodiments, which will not be repeated here.

At S142, a CORESET having two or more TCI states configured with QCL-typeD and corresponding to a SS set with a lowest index is determined from the CORESETs as the first CORESET.

Figure 15:
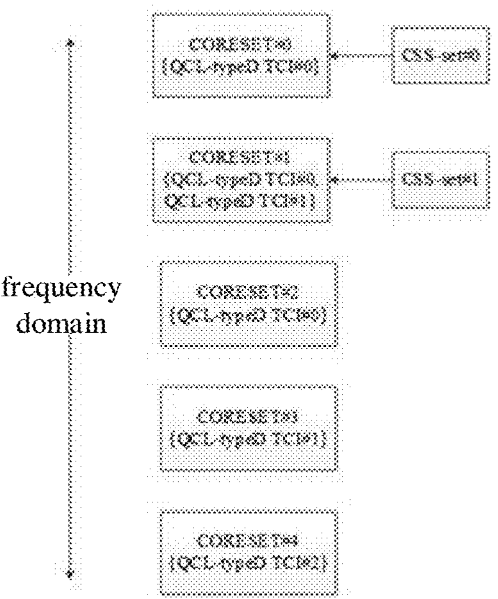
FIG. 15 is a diagram illustrating a method for monitoring a PDCCH according to another embodiment of the present disclosure.

The terminal device determines a CORSET that satisfies the following two conditions from the CORSETs as the first CORSET. The first condition is that, the CORESET includes two or more TCI states configured with QCL-typeD. The second condition is that, the CORSET is one corresponding to a SS set with a lowest index. The method for monitoring a PDCCH in an embodiment of the present disclosure is explained in combination with FIG. 15. As illustrated in FIG. 15, a CORESET #1 from CORESET #0~ CORESET #4 satisfies the above two conditions, and is determined as the first CORSET. The TCI configuration information of the CORESET #1 is that the TCI states configured with QCL-typeD include TCI #0 and TCI #1. Since the target monitoring mode of the PDCCH determined by the terminal device is a target monitoring mode 2, the CORESET #1 may be monitored by the terminal device.

At S143, a ninth CORSET having at least a part of the two or more TCI states configured with QCL-typeD is determined from the CORSETs other than the first CORSET according to the index value sequence of the SS sets. The CORSETs to be monitored include the first CORSET and the ninth CORSET.

Continuing with FIG. 15 as an example, the CORSET #1 includes the TCI #0 and the TCI #1. When there are other CORSETs having the same TCI #0 configured with QCL-typeD and/or the TCI #1 configured with QCL-typeD within the current symbol, the other CORSETs may be monitored, and a TCI subset of the CORSET #1 may be monitored. Therefore, the CORESET #0, the CORESET #1, the CORESET #2 and the CORESET #3 in FIG. 15 may be monitored by the terminal device simultaneously.

In the embodiments of the disclosure, the target monitoring mode of the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

FIG. 16 is a flowchart illustrating a method for monitoring a PDCCH according to an embodiment of the disclosure. The method for monitoring a PDCCH is performed by a terminal device. As illustrated in FIG. 16, the method includes the following steps S161 to S163.

At S161, a transmission mode of the PDCCH is determined via an RRC signaling and/or MAC CE activation information.

In some embodiments, the terminal device determines the transmission mode of the PDCCH via the RRC signaling. Optionally, when the terminal device receives an SFN transmission configuration of the PDCCH via the RRC, it is determined that a transmission mode of the current PDCCH is the SFN transmission mode; and when the terminal device does not receive the SFN transmission configuration of the PDCCH, it is determined that the current PDCCH is in a single-point transmission mode or in other transmission modes.

In some embodiments, the terminal device determines the transmission mode of the PDCCH via the MAC-CE activation information. Optionally, when the terminal device receives that there are two TCI state fields in the MAC-CE activation information, it is determined that the current PDCCH is in the SFN transmission mode. When the terminal device receives that there is one TCI state field in the MAC-CE activation information, it is determined that the current PDCCH is in the single-point transmission mode or in the other transmission modes.

In some embodiments, the terminal device determines the transmission mode of the PDCCH via both the RRC signaling and the MAC CE activation information. Optionally, when the terminal device receives the SFN transmission configuration via the RRC signaling and there are two TCI state fields in the MAC-CE activation information, it is determined that the current PDCCH is in the SFN transmission mode; when the UE receives the SFN transmission configuration via the RRC signaling and there is only one TCI state field in the MAC-CE activation information, it is determined that the current PDCCH is in the single-point transmission mode or in the other transmission modes; and when the UE does not receive the SFN transmission configuration via the RRC signaling and there is only one TCI state field in the MAC-CE activation information, it is determined that the current PDCCH is in the single-point transmission mode or in the other transmission modes.

Optionally, transmission configuration information of the SFN transmission of the PDCCH may be:

SDMscheme1, SDMscheme1forPDCCH, etc.

At S162, in response to the transmission mode of the PDCCH being the SFN transmission, and the RRC signaling and/or a MAC CE signaling being configured with two or more TCI states configured with QCL-typeD, a mode for determining the CORESETs to be monitored corresponding to the two or more TCI states configured with QCL-typeD is determined as a target monitoring mode.

That is, when the transmission mode of the PDCCH is the SFN transmission, and the RRC signaling and/or the MAC CE signaling are configured with two or more TCI states configured with QCL-typeD, the terminal device determines the target monitoring mode as the target monitoring mode 2, that is, determines CORESETs to be monitored corresponding to the two or more TCI states configured with QCL-typeD.

At 163, in response to the transmission mode of the PDCCH being the single-point transmission, a mode for determining the CORESETs to be monitored corresponding to one TCI state configured with QCL-typeD is determined as the target monitoring mode.

That is, when the transmission mode of the PDCCH is the single-point transmission, the terminal device determines the target monitoring mode as the target monitoring mode 1, that is, determines CORESETs to be monitored corresponding to one TCI state configured with QCL-typeD.

FIG. 17 is a flowchart illustrating a method for monitoring a PDCCH in an embodiment of the present disclosure. The method for monitoring a PDCCH is performed by a network device. As illustrated in FIG. 17, the method may include the following steps.

At S171, indication information is sent to a terminal device. The indication information is configured to indicate a target monitoring mode corresponding to a PDCCH to the terminal device. The target monitoring mode is configured to determine CORESETs to be monitored within an overlapping time domain corresponding to a plurality of monitoring occasions.

In the embodiments of the disclosure, the target monitoring mode of the PDCCH is one of:

- a mode configured to determine the CORESETs to be monitored corresponding to one TCI state configured with QCL-typeD, which may be referred to as a target monitoring mode 1: and
- a mode configured to determine the CORESETs to be monitored corresponding to two or more TCI states configured with QCL-typeD, which may be referred to as a target monitoring mode 2.

In some embodiments, the network device sends transmission configuration information of a SFN transmission to the terminal device. The transmission configuration information includes a first RRC configuration parameter. A target monitoring mode is determined according to the first RRC configuration parameter.

Optionally, when the terminal device does not receive the first RRC configuration parameter, such as EnableTwoQCL-typeD, of the SFN transmission configuration information, the CORESETs to be monitored corresponding to one TCI state configured with QCL-typeD may be determined according to the target monitoring mode 1.

Optionally, when the terminal device receives the first RRC configuration parameter, such as EnableTwoQCL-typeD, for monitoring two TCI states configured with QCL-typeD within a symbol, the CORESETs to be monitored corresponding to the two TCI states configured with QCL-typeD may be determined according to the target monitoring mode 2.

In some embodiments, the terminal device may send a TCI-states monitoring capability within the overlapping time domain corresponding to the plurality of monitoring occasions of the terminal device to the network device. The TCI-states monitoring capability is configured to indicate whether the terminal device has a capability for monitoring a CORSET having a plurality of TCI states configured with QCL-typeD. When the network device receives the TCI-states monitoring capability, and the terminal device has the capability for monitoring a CORSET having the plurality of TCI states configured with QCL-typeD, the network device sends a second RRC configuration parameter for indicating to monitor a TCI state configured with QCL-typeD to the terminal device. Correspondingly, the terminal device may receive the second RRC configuration parameter sent by the network device, and determine the target monitoring mode according to the second RRC configuration parameter.

Optionally, when the terminal device does not receive the second RRC configuration parameter for indicating to monitor two or more TCI states configured with QCL-typeD within a symbol, such as SDMscheme1 or SDMscheme1forPDCCH, the CORESETs to be monitored corresponding to one TCI state configured with QCL-typeD may be determined according to the target monitoring mode 1.

Optionally, when the terminal device receives the second RRC configuration parameter monitoring the two or more TCI states configured with QCL-typeD within a symbol, such as SDMscheme1 or SDMscheme1forPDCCH, the CORESETs to be monitored corresponding to the two or more TCI states configured with QCL-typeD may be determined according to the target monitoring mode 2.

In some embodiments, the terminal device may determine the target monitoring mode of the PDCCH according to the TCI-states monitoring capability within the overlapping time domain corresponding to the plurality of monitoring occasions of the terminal device itself.

Optionally, when the terminal device does not have the capability for monitoring the two or more TCI states configured with QCL-typeD, the CORESETs to be monitored corresponding to one TCI state configured with QCL-typeD may be determined according to the target monitoring mode 1.

Optionally, the network device indicates a transmission mode of the PDCCH to the terminal device via an RRC signaling and/or a MAC CE signaling.

In some embodiments, the terminal device determines the transmission mode of the PDCCH via the RRC signaling. Optionally, when the terminal device receives an SFN transmission configuration of the PDCCH via the RRC, it is determined that a transmission mode of the current PDCCH is the SFN transmission mode: and when the terminal device does not receive the SFN transmission configuration of the PDCCH, it is determined that the current PDCCH is in a single-point transmission mode or in other transmission modes.

In some embodiments, the terminal device determines the transmission mode of the PDCCH via the MAC-CE activation information. Optionally, when the terminal device receives that there are two TCI state fields in the MAC-CE activation information, it is determined that the current PDCCH is in the SFN transmission mode. When the terminal device receives that there is one TCI state field in the MAC-CE activation information, it is determined that the current PDCCH is in the single-point transmission mode or in the other transmission modes.

In some embodiments, the terminal device determines the transmission mode of the PDCCH via both the RRC signaling and the MAC-CE activation information. When the terminal device receives the SFN transmission configuration via the RRC signaling and there are two TCI state fields in the MAC-CE activation information, it is determined that the current PDCCH is in the SFN transmission mode: when the UE receives the SFN transmission configuration via the RRC signaling and there is only one TCI state field in the MAC-CE activation information, it is determined that the current PDCCH is in the single-point transmission mode or in the other transmission modes: and when the UE does not receive the SFN transmission configuration via the RRC signaling and there is only one TCI state field in the MAC-CE activation information, it is determined that the current PDCCH is in the single-point transmission mode or in the other transmission modes.

Optionally, transmission configuration information of the SFN transmission of the PDCCH may be:

SDMscheme1, SDMscheme1forPDCCH, etc.

Optionally, when the transmission mode of the PDCCH is the SFN transmission and the RRC signaling and/or the MAC CE signaling are configured with two or more TCI states configured with QCL-typeD, the terminal device determines the target monitoring mode as the target monitoring mode 2, that is, determines CORESETs to be monitored corresponding to the two or more TCI states configured with QCL-typeD.

Optionally, when the transmission mode of the PDCCH is the single-point transmission, the terminal device determines the target monitoring mode as the target monitoring mode 1, that is, determines CORESETs to be monitored corresponding to one TCI state configured with QCL-typeD.

In the embodiments of the disclosure, the target monitoring mode of the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

Figure 18:
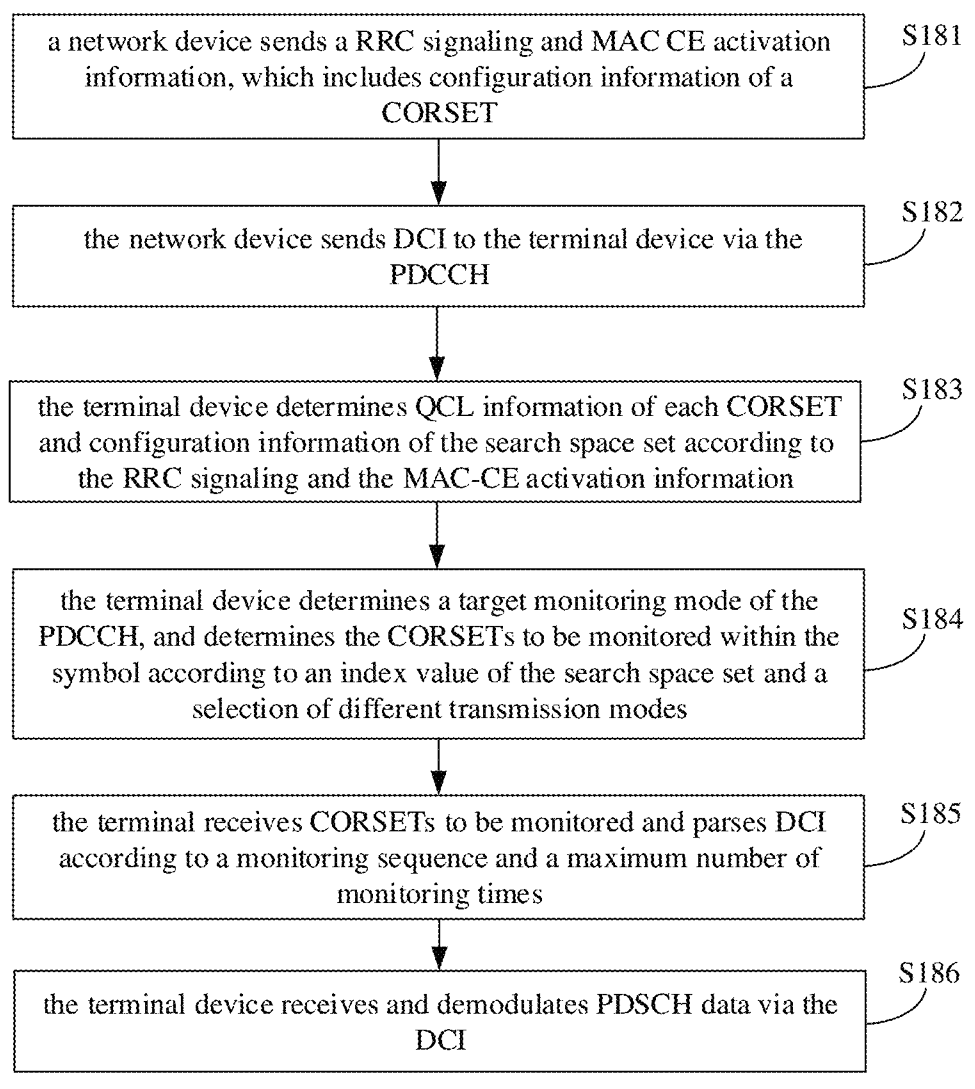
FIG. 18 is a flowchart illustrating a method for monitoring a PDCCH according to another embodiment of the present disclosure.

FIG. 18 is a flowchart illustrating a method for monitoring a physical downlink control channel (PDCCH) in an embodiment of the present disclosure. As illustrated in FIG. 18, the method may include the following steps S181 to S186.

At S181, a network device sends a RRC signaling or MAC CE activation information, which includes configuration information of a CORSET.

The network device configures a plurality of CORSETs to the terminal device via the RRC signaling and carries configuration information of the CORSETs. For example, the configuration information of the CORSETs may include QCL information, configuration information of the SS-set and TCI states. Further, the network device activates one or more TCI states of a part of the plurality of CORSETs via the MAC CE activation information.

At S182, the network device sends downlink control information (DCI) to the terminal device via the PDCCH.

At S183, the terminal device determines QCL information of each CORSET and configuration information of the SS-set based the RRC signaling or the MAC-CE activation information.

At S184, the terminal device determines a target monitoring mode of the PDCCH, and determines the CORSETs to be monitored within the symbol according to an index value of the SS-set and a selection of different transmission modes.

With respect to the target monitoring mode and the implementation that the terminal device determines the target monitoring mode of the PDCCH, any implementation of the embodiments of the disclosure may be referred, which will not be repeated here.

At S185, the terminal receive CORSETs to be monitored and parses DCI according to a monitoring sequence and a maximum number of monitoring times.

Optionally, the network device may indicate the monitoring sequence and the maximum number of monitoring times, and optionally, the terminal device determines the monitoring sequence and the maximum number of monitoring times according to a protocol.

At S186, the terminal device receives and demodulates physical downlink shared channel (PDSCH) data via DCI.

In the embodiments of the disclosure, the target monitoring mode of the PDCCH is first determined according to the transmission mode of the PDCCH, and CORSETs to be monitored are determined within the overlapping time domain corresponding to the plurality of monitoring occasions according to the target monitoring mode. In the disclosure, the CORESETs to be monitored within the overlapping time domain corresponding to the plurality of monitoring occasions may be determined, thereby ensuring correct reception and parsing of the control channel/information.

Figure 19:
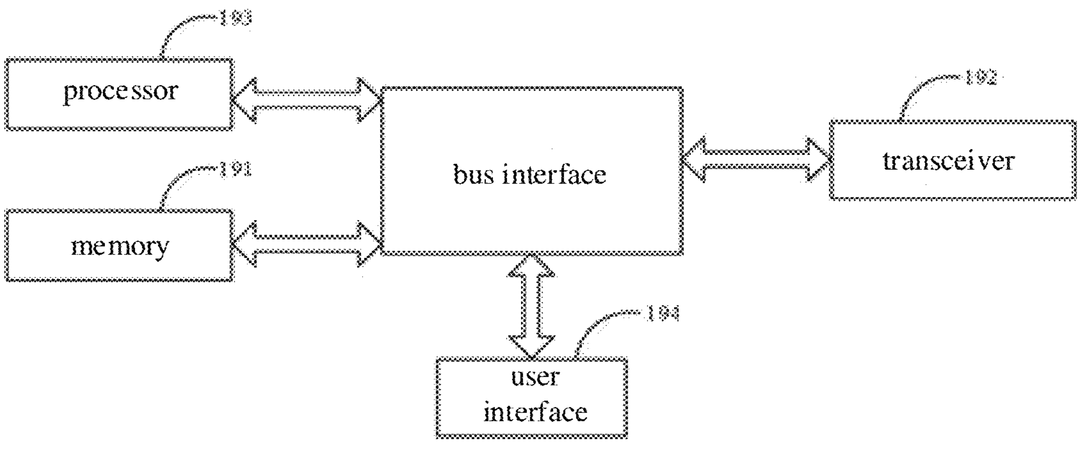
FIG. 19 is a structural diagram illustrating a communication device according to an embodiment of the present disclosure.

FIG. 19 is a structural diagram illustrating a communication device according to an embodiment of the present disclosure. As illustrated in FIG. 19, the communication device 190 includes: a memory 191, configured to store a computer program: and a transceiver 192, configured to transmit and receive data under a control of a processor 193.

The communication device 190 is a terminal device.

The processor 193 is configured to read the computer program stored in the memory and perform operations of:

determining a target monitoring mode of the PDCCH: and determining CORESETs to be monitored within an overlapping time domain corresponding to a plurality of monitoring occasions according to the target monitoring mode.

Optionally, the processor 193 is further configured to read the computer program stored in the memory and perform operations of:

receiving transmission configuration information of a SFN transmission sent by a network device, in which the transmission configuration information includes a first RRC configuration parameter, and determining the target monitoring mode according to the first RRC configuration parameter; or, sending to the network device, a TCI-states monitoring capability within the overlapping time domain corresponding to the plurality of monitoring occasions of the terminal device, receiving a second RRC configuration parameter sent by the network device and indicating to monitor a TCI state configured with QCL-typeD, and determining the target monitoring mode according to the second RRC configuration parameter, in which the TCI-states monitoring capability is configured to indicate whether the terminal device has a capability for monitoring a CORSET having a plurality of TCI states configured with QCL-typeD; or determining the TCI-states monitoring capability within the overlapping time domain corresponding to the plurality of monitoring occasions of the terminal device, and determining a target monitoring mode according to the monitoring capability.

Optionally, the processor 193 is further configured to read the computer program stored in the memory and perform operations of:

determining a first CORESET, and determining the CORESETs to be monitored according to a TCI state configuration or a QCL configuration of the first CORESET.

Optionally, the processor 193 is further configured to read the computer program stored in the memory and perform operations of:

determining a CORESET corresponding to a SS set with a lowest index as a first CORESET.

Optionally, the processor 193 is further configured to read the computer program stored in the memory and perform operations of:

determining, from the CORESETs, a CORESET having two or more TCI states configured with QCL-typeD and corresponding to a SS set with a lowest index, as the first CORESET.

Optionally, the processor 193 is further configured to read the computer program stored in the memory and perform operations of:

finding the first CORESET preferentially according to a lowest index of a CSS set, and in response to the first CORESET being not found according to the lowest index of the CSS set, finding the first CORESET according to the lowest index of a USS set.

Optionally, the target monitoring mode is a mode for determining CORESETs to be monitored corresponding to one TCI state configured with QCL-typeD, and the processor 193 is further configured to read the computer program stored in the memory and perform operations of:

in response to the TCI state configuration or the QCL configuration of the first CORSET only having one first target TCI state configured with QCL-typeD, determining, from CORSETs other than the first CORSET, a second CORSET having the same first target TCI state as the first CORSET according to an index value sequence of SS sets. The CORSETs to be monitored include the first CORSET and the second CORSET.

Optionally, the processor 193 is further configured to read the computer program stored in the memory and perform operations of:

in response to the TCI state configuration or the QCI state configuration of the first CORSET having two or more TCI states configured with QCL-typeD, determining that the first CORSET may not be served as the CORSET to be monitored;

determining, from the CORSETs other than the first CORSET, a third CORSET having a second target TCI state in the two or more TCI states configured with QCL-typeD and corresponding to the SS set with a lowest index; and determining a fourth CORSET having the same second target TCI state, in which the CORSETs to be monitored include the third CORSET and the fourth CORSET.

Optionally, the processor 193 is further configured to read the computer program stored in the memory and perform operations of:

in response to determining that the first CORSET may not be served the CORSET to be monitored, determining a third target TCI state from the two or more TCI states configured with QCL-typeD in the first CORSET; and determining a fifth CORSET having the third target TCI state from the CORSETs other than the first CORSET according to the index value sequence of the SS sets. The CORSETs to be monitored include the fifth CORSET.

Optionally, the target monitoring mode is a mode for determining CORESETs to be monitored corresponding to two or more TCI states configured with QCL-typeD, and the processor 193 is further configured to read the computer program stored in the memory and perform operations of:

in response to the TCI state configuration or the QCL configuration of the first CORSET only having one fourth target TCI state configured with QCL-typeD, determining, from CORSETs other than the first CORSET, a sixth CORSET having the two or more TCI states configured with QCL-typeD according to an index value sequence of SS sets; and determining, from the sixth CORSET, a seventh CORSET having the fourth target TCI state in the two or more TCI states configured with QCL-typeD. The CORSETs to be monitored include the first CORSET and the seventh CORSET.

Optionally, the processor 193 is further configured to read the computer program stored in the memory and perform operations of:

in response to the TCI state configuration or the QCL configuration of the first CORSET only having one fifth target TCI state configured with QCL-typeD, determining, from remaining TCI states configured with QCL-typeD, at least one TCI state as a monitored TCI state; and determining, from the CORSETs other than the first CORSET, an eighth CORSET having the monitored TCI state and/or the fifth target TCI state according to the index value sequence of the SS sets. The CORSETs to be monitored include the first CORSET and the eighth CORSET.

Optionally, the processor 193 is further configured to read the computer program stored in the memory and perform operations of:

in response to the TCI state configuration or the QCL configuration of the first CORSET having the two or more TCI states configured with QCL-typeD, determining, from the CORSETs other than the first CORSET, a ninth CORSET having at least a part of the two or more TCI states configured with QCL-typeD according to the index value sequence of the SS sets. The CORSETs to be monitored include the first CORSET and the ninth CORSET.

Optionally, the processor 193 is further configured to read the computer program stored in the memory and perform operations of:

determining a transmission mode of the PDCCH via an RRC signaling and/or MAC CE activation information;

in response to the transmission mode of the PDCCH being a SFN transmission, and the RRC signaling and/or a MAC CE signaling being configured with two or more TCI states configured with QCL-typeD, determining a mode for determining the CORESETs to be monitored corresponding to the two or more TCI states configured with QCL-typeD as the target monitoring mode; or in response to the transmission mode of the PDCCH being a single-point transmission, determining a mode for determining the CORESETs to be monitored corresponding to one TCI state configured with QCL-typeD as the target monitoring mode.

It needs to be noted that, the apparatus according to the embodiments of the present disclosure may implement all the method steps achieved by the above method embodiments, and may achieve the same technical effect. The same part of the embodiments as the method embodiments and the beneficial effects are not repeated in the embodiments of the present disclosure.

In FIG. 19, a bus architecture may include any number of interconnected buses and bridges, and specifically link various circuits having one or more processors represented by the processor 193 and memories represented by the memory 191. The bus architecture may further link various other circuits such as peripheral devices, voltage regulators and power management circuits, which are well known in the art and will not be further described herein. A bus interface provides an interface. The transceiver 192 may be a plurality of elements, i.e., which include a transmitter and a receiver, and provide units for communicating with various other apparatuses on transmission media. The transmission media include a wireless channel, a wired channel, an optic cable and other transmission media. For different user devices, the user interface 194 may also be an interface capable of externally or internally connecting required devices. The connected devices include, but are not limited to, keyboards, monitors, speakers, microphones, joysticks, etc.

The processor 193 is in charge of managing the bus architecture and general processes, and the memory 191 may store data used by processor 193 in performing operations.

Optionally, the processor 193 may be a central processing unit (CPU), an application specific integrated circuit (ASIC), a field-programmable gate array (FPGA) or a complex programmable logic device (CPLD). The processor may adopt a multi-core architecture.

The processor 193 is configured to call a computer program stored in the memory 191 and perform any one of the methods according to the embodiments of the present disclosure according to an acquired executable instruction. The processor and the memory may also be physically separated.

With the communication device according to the embodiments of the disclosure, the target monitoring mode for the PDCCH is first determined; and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

Figures 20, 21, 22:
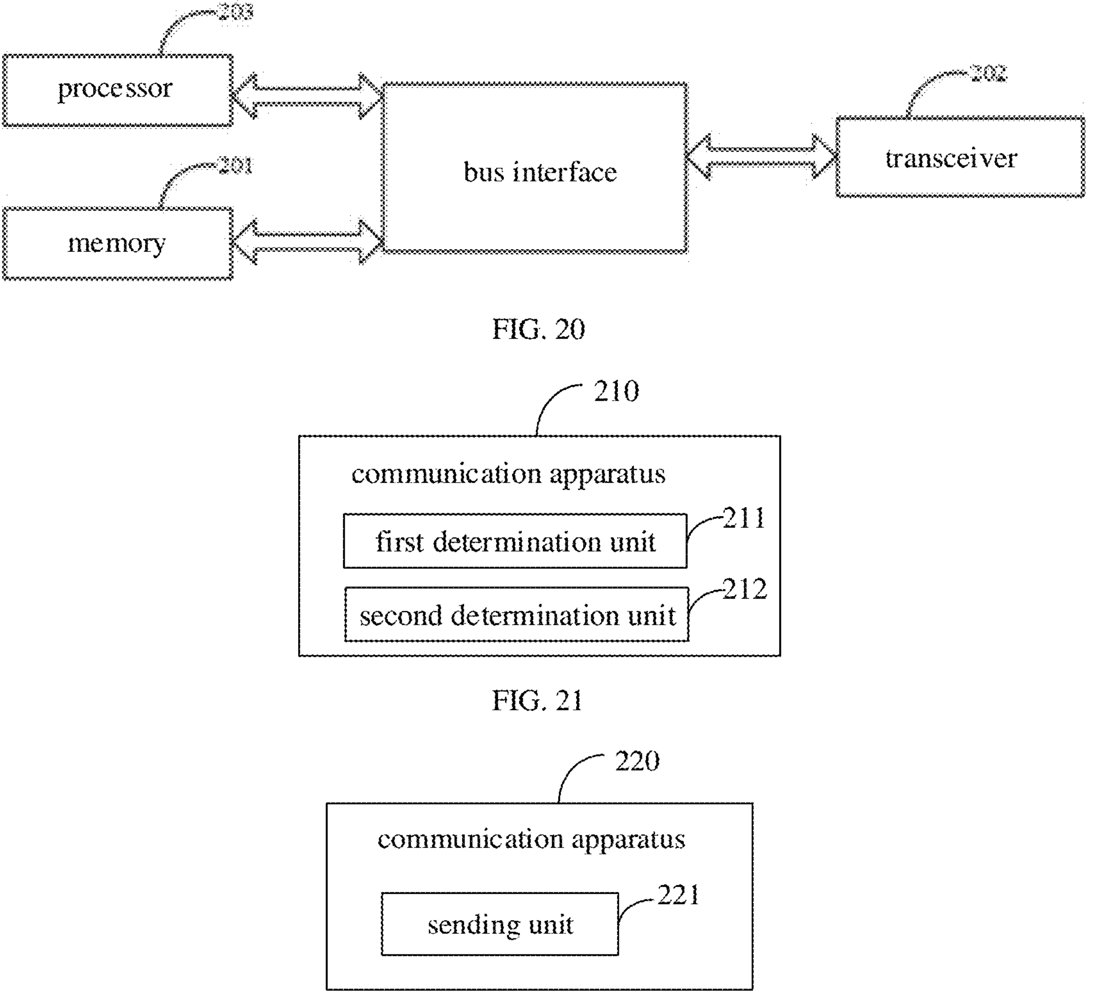
FIG. 20 is a structural diagram illustrating a communication device according to another embodiment of the present disclosure.
FIG. 21 is a structural diagram illustrating communication apparatus according to another embodiment of the present disclosure.
FIG. 22 is a structural diagram illustrating communication apparatus according to another embodiment of the present disclosure.

FIG. 20 is a structural diagram illustrating a communication device according to an embodiment of the present disclosure. As illustrated in FIG. 20, the communication device 200 includes: a memory 201, configured to store a computer program: and a transceiver 202, configured to transmit and receive data under a control of a processor 203.

The communication device 200 is a network device.

The processor 203 is configured to read the computer program stored in the memory and perform operations of:

sending indication information to a terminal device. The indication information is configured to indicate a target monitoring mode corresponding to a PDCCH to the terminal device. The target monitoring mode is configured to determine CORESETs to be monitored within an overlapping time domain corresponding to a plurality of monitoring occasions.

Optionally, the processor 203 is further configured to read the computer program stored in the memory and perform operations of:

sending transmission configuration information of a SFN transmission to the terminal device, in which the transmission configuration information includes a first RRC configuration parameter, and determining the target monitoring mode according to the first RRC configuration parameter; or, receiving a TCI-states monitoring capability within the overlapping time domain corresponding to the plurality of monitoring occasions of the terminal device sent by the terminal device, in which the TCI-states monitoring capability is configured to indicate whether the terminal device has a capability for monitoring a CORSET having a plurality of TCI states configured with QCL-typeD; or sending a second RRC configuration parameter for indicating to monitor a TCI state configured with QCL-typeD to the terminal device. The second RRC configuration parameter is configured to determine the target monitoring mode.

Optionally, the target monitoring mode is one of:

a mode configured to determine the CORESETs to be monitored corresponding to one TCI state configured with QCL-typeD: or a mode configured to determine the CORESETs to be monitored corresponding to two or more TCI states configured with QCL-typeD.

Optionally, the processor 203 is further configured to read the computer program stored in the memory and perform operations of:

indicating a transmission mode of the PDCCH to the terminal device via an RRC signaling and/or a MAC CE signaling.

It needs to be noted that, the apparatus according to the embodiments of the present disclosure may implement all the method steps achieved by the above method embodiments, and may achieve the same technical effects. The same part of the embodiments as the method embodiments and the beneficial effects are not repeated in the embodiments of the present disclosure.

In FIG. 20, a bus architecture may include any number of interconnected buses and bridges, and specifically link various circuits having one or more processors represented by the processor 203 and memories represented by the memory 201. The bus architecture may further link various other circuits such as peripheral devices, voltage regulators and power management circuits, which are well known in the art and will not be further described herein. A bus interface provides an interface. The transceiver 202 may be a plurality of elements, i.e., include a transmitter and a receiver, and provide units for communicating with various other apparatuses on transmission media. The transmission media include a wireless channel, a wired channel, an optic cable and other transmission media. The processor 203 is in charge of managing the bus architecture and general processes, and the memory 201 may store data used by processor 203 in performing operations.

The processor 203 may be a central processing unit (CPU), an application specific integrated circuit (CPU), a field-programmable gate array (FPGA) or a complex programmable logic device (CPLD). The processor 130 may also adopt a multi-core architecture.

With the communication device according to the embodiments of the disclosure, the target monitoring mode for the PDCCH is first determined; and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

FIG. 21 is a structural diagram illustrating a communication device according to an embodiment of the present disclosure. As illustrated in FIG. 21, the communication apparatus 210 includes a first determining unit 211 and a second determining unit 212.

The first determining unit 211 is configured to determine a target monitoring mode of a PDCCH.

The second determining unit 212 is configured to determine CORESETs to be monitored within an overlapping time domain corresponding to a plurality of monitoring occasions according to the target monitoring mode.

Optionally, the first determining unit 211 is further configured to:

receive transmission configuration information of a SFN transmission sent by a network device, in which the transmission configuration information includes a first RRC configuration parameter, and determine the target monitoring mode according to the first RRC configuration parameter; or, send to the network device, a TCI-states monitoring capability within the overlapping time domain corresponding to the plurality of monitoring occasions of the terminal device, receive a second RRC configuration parameter sent by the network device and indicating to monitor a TCI state configured with QCL-typeD, and determine the target monitoring mode according to the second RRC configuration parameter, in which the TCI-states monitoring capability is configured to indicate whether the terminal device has a capability for monitoring a CORSET having a plurality of TCI states configured with QCL-typeD; or determine the TCI-states monitoring capability within the overlapping time domain corresponding to the plurality of monitoring occasions of the terminal device, and determine a target monitoring mode according to the monitoring capability.

Optionally, the second determining unit 212 is further configured to: determine a first CORESET, and determine the CORESETs to be monitored according to a TCI state configuration or a QCL configuration of the first CORESET.

Optionally, the second determining unit 212 is further configured to: determine a CORESET corresponding to a SS set with a lowest index as a first CORESET.

Optionally, the second determining unit 212 is further configured to: determine, from the CORESETs, a CORESET having two or more TCI states configured with QCL-typeD and corresponding to a SS set with a lowest index, as the first CORESET.

Optionally, the second determining unit 212 is further configured to:

find the first CORESET preferentially according to a lowest index of a CSS set, and in response to the first CORESET being not found according to the lowest index of the CSS set, find the first CORESET according to the lowest index of a USS set.

Optionally, the target monitoring mode is a mode configured to determine the CORESETs to be monitored corresponding to one TCI state configured with QCL-typeD. The second determining unit 212 is further configured to:

in response to the TCI state configuration or the QCL configuration of the first CORSET only having one first target TCI state configured with QCL-typeD, determine, from CORSETs other than the first CORSET, a second CORSET having the same first target TCI state as the first CORSET according to an index value sequence of SS sets. The CORSETs to be monitored include the first CORSET and the second CORSET.

Optionally, the second determining unit 212 is further configured to:

in response to the TCI state configuration or the QCI state configuration of the first CORSET having two or more TCI states configured with QCL-typeD, determine that the first CORSET may not be served as the CORSET to be monitored;

determine, from the CORSETs other than the first CORSET, a third CORSET having a second target TCI state in the two or more TCI states configured with QCL-typeD and corresponding to the SS set with a lowest index; and determine a fourth CORSET having the same second target TCI state. The CORSETs to be monitored include the third CORSET and the fourth CORSET.

Optionally, the second determining unit 212 is further configured to:

in response to determining that the first CORSET may not be served the CORSET to be monitored, determine a third target TCI state from the two or more TCI states configured with QCL-typeD in the first CORSET; and determine a fifth CORSET having the third target TCI state from the CORSETs other than the first CORSET according to the index value sequence of the SS sets. The CORSETs to be monitored include the fifth CORSET.

Optionally, a target monitoring mode is a mode configured to determine the CORESETs to be monitored corresponding to two or more TCI states configured with QCL-typeD. The second determining unit 212 is further configured to:

in response to the TCI state configuration or the QCL configuration of the first CORSET only having one fourth target TCI state configured with QCL-typeD, determine, from CORSETs other than the first CORSET, a sixth CORSET having the two or more TCI states configured with QCL-typeD according to an index value sequence of SS sets; and determine, from the sixth CORSET, a seventh CORSET having the fourth target TCI state in the two or more TCI states configured with QCL-typeD. The CORSETs to be monitored include the first CORSET and the seventh CORSET.

Optionally, the second determining unit 212 is further configured to:

in response to the TCI state configuration or the QCL configuration of the first CORSET only having one fifth target TCI state configured with QCL-typeD, determine, from remaining TCI states configured with QCL-typeD, at least one TCI state as a monitored TCI state; and determine, from the CORSETs other than the first CORSET, an eighth CORSET having the monitored TCI state and/or the fifth target TCI state according to the index value sequence of the SS sets. The CORSETs to be monitored include the first CORSET and the eighth CORSET.

Optionally, the second determining unit 212 is further configured to:

in response to the TCI state configuration or the QCL configuration of the first CORSET having the two or more TCI states configured with QCL-typeD, determine, from the CORSETs other than the first CORSET, a ninth CORSET having at least a part of the two or more TCI states configured with QCL-typeD according to the index value sequence of the SS sets. The CORSETs to be monitored include the first CORSET and the ninth CORSET.

Optionally, the first determining unit 211 is further configured to:

determine a transmission mode of the PDCCH via an RRC signaling and/or MAC CE activation information;

in response to the transmission mode of the PDCCH being a SFN transmission, and the RRC signaling and/or a MAC CE signaling being configured with two or more TCI states configured with QCL-typeD, determine a mode for determining the CORESETs to be monitored corresponding to the two or more TCI states configured with QCL-typeD as the target monitoring mode; or in response to the transmission mode of the PDCCH being a single-point transmission, determine a mode for determining the CORESETs to be monitored corresponding to one TCI state configured with QCL-typeD as the target monitoring mode.

It needs to be noted that, the apparatus according to the embodiments of the present disclosure may implement all method steps achieved by the above method embodiments, and may achieve the same technical effects. The same part of the embodiments as the method embodiments and the beneficial effects are not repeated in the embodiments of the present disclosure.

With the communication device according to the embodiments of the disclosure, the target monitoring mode for the PDCCH is first determined: and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

FIG. 22 is a structural diagram illustrating a communication apparatus according to an embodiment of the present disclosure. As illustrated in FIG. 22, the communication apparatus 220 includes sending unit 221.

The sending unit 221 is configured to send indication information to a terminal device. The indication information is configured to indicate a target monitoring mode corresponding to a PDCCH to the terminal device. The target monitoring mode is configured to determine CORESETs to be monitored within an overlapping time domain corresponding to a plurality of monitoring occasions.

Optionally, the sending unit 221 is further configured to:

send transmission configuration information of a SFN transmission to the terminal device, in which the transmission configuration information includes a first RRC configuration parameter, and determine the target monitoring mode according to the first RRC configuration parameter; or, receive a TCI-states monitoring capability within the overlapping time domain corresponding to the plurality of monitoring occasions of the terminal device sent by the terminal device, in which the TCI-states monitoring capability is configured to indicate whether the terminal device has a capability for monitoring a CORSET having a plurality of TCI states configured with QCL-typeD; or send a second RRC configuration parameter for indicating to monitor a TCI state configured with QCL-typeD to the terminal device. The second RRC configuration parameter is configured to determine the target monitoring mode.

Optionally, the target monitoring mode is one of:

a mode configured to determine the CORESETs to be monitored corresponding to one TCI state configured with QCL-typeD; or a mode configured to determine the CORESETs to be monitored corresponding to two or more TCI states configured with QCL-typeD.

Optionally, the sending unit 221 is further configured to:

indicate a transmission mode of the PDCCH to the terminal device via an RRC signaling and/or a MAC CE signaling.

It needs to be noted that, the apparatus according to the embodiments of the present disclosure may implement all the method steps achieved by the above method embodiments, and may achieve the same technical effects. The same part of the embodiments as the method embodiments and the beneficial effects are not repeated in the embodiments of the present disclosure.

With the communication apparatus according to the embodiments of the disclosure, the target monitoring mode for the PDCCH is first determined, and CORESETs to be monitored within the overlapping time domain corresponding to the plurality of monitoring occasions are determined according to the target monitoring mode. In the disclosure, the CORESETs to be monitored within the overlapping time domain corresponding to the plurality of monitoring occasions may be determined, thereby ensuring correct reception and parsing of the control channel/information.

It should be noted that, division of units in the embodiments of the present disclosure is illustrative, and only a logical function division. There may be another division method in the actual implementation. In addition, functional units in the embodiments of the present disclosure may be integrated in a processing unit, or may be physically existed separately, or two or more units may be integrated in one unit. The above integrated unit may be implemented in the form of a hardware or in the form of a software functional unit.

The integrated unit may be stored in a processor readable storage medium if it is implemented in the form of a software function unit and sold and used as an independent product. On the basis of such an understanding, a substantial part contributing to the related art in the technical solution of the present disclosure, or all or part of the technical solution, may be embodied in the form of a software product. The computer software product is stored in a storage medium including several instructions so that a computer device (which may be a personal computer, a server or a network device) or a processor is caused to perform all or part of steps in each method embodiment of the present disclosure. The forgoing storage medium includes a USB disk, a mobile hard disk, a read-only memory (ROM), a random access memory (RAM), a magnetic disk or an optical disk and other medium that may store program codes.

A processor-readable storage medium stored with a computer program is provided in the embodiments of the disclosure. The computer program is configured to cause a processor to perform the method according to the above embodiment.

The processor-readable storage medium may be any available medium or data storage device that the processor may access, including but not limited to a magnetic memory (e.g., a floppy disk, a hard disk, a magnetic tape, a magnetic optical disk (MO)) and an optical memory (e.g., a CD, a DVD, a BD, a HVD), and a semiconductor memory (e.g., a ROM, an EPROM, an EEPROM, a non-volatile memory (a NAND a FLASH), a solid state drive (SSD)).

The technical solution according to the embodiments of the present disclosure is applicable to a variety of systems, particularly a 5G system. For example, applicable systems may be a global system of mobile communication (GSM) system, a code division multiple access (CDMA) system, a wideband code division multiple access (WCDMA) system, a general packet radio service (GPRS) system, a long term evolution (LTE) system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. The variety of systems include a terminal device and a network device. The system may further include core network components, such as an evolved packet system (EPS) and a 5G system (5GS).

The terminal device involved in the embodiments of the present disclosure may refer to a device that provides voice and/or data connectivity to a user, a handheld device with a wireless connection function, or other processing devices connected to a radio modem. In different systems, the name of the terminal device may be different. For example, the terminal device may be referred to a user equipment (UE). The wireless terminal device may communicate with one or more core networks (CNs) via a radio access network (RAN). The wireless terminal device may be a mobile terminal device, for example, a mobile phone (or referred to as a cellular phone) and a computer having a mobile terminal device, for example, which may be a portable, compact, handheld, computer built-in or vehicle-mounted mobile device that exchange language and/or data with a wireless access network, for example, devices such as a personal communication service (PCS) phone, a cordless telephone, a session initiated protocol (SIP) phone, a wireless local loop (WLL) station, a personal digital assistant (PDA), and the like. The wireless terminal device may also be referred to as a system, a subscriber unit, a subscriber station, a mobile station, a mobile, a remote station, an access point, a remote terminal, an access terminal, a user terminal, a user agent or a user device, which is not limited in the embodiments of the present disclosure.

The network device involved in embodiments of the disclosure may be a base station, and the base station may include a plurality of cells that provide services for a terminal. According to different specific application occasions, the base station may also be referred to as an access point, or may be a device in an access network that communicates with a wireless terminal device via one or more sectors on an air interface in the access network, or other names. The network device may be configured to exchange a received air frame with an Internet Protocol (IP) packet, as a router between a wireless UE and a remainder of an access network. The remainder of the access network may include an IP communication network. The network device may further coordinate attribute management of the air interface. For example, the network device involved in the embodiments of the present disclosure may be a base transceiver station (BTS) in a global system for mobile communications (GSM) or code division multiple access (CDMA)), or may be a network device (NodeB) in wide-band code division multiple access (WCDMA), or may be an evolutional Node B (eNB or e-NodeB) in a long term evolution (LTE) system, or may be a 5G base station (gNB) in a next generation system, or may be a home evolved Node B (HeNB), a relay node, a femto, and a pico, which is not limited in the embodiments of the present disclosure. In some network structures, the network device may include a centralized unit (CU) node and a distributed unit (DU) node that may also be geographically separated.

A multi input multi output (MIMO) transmission may be performed between the network device and the terminal device by using one or more antennas. The MIMO transmission may be a single user MIMO (SU-MIMO) or a multiple user MIMO (MU-MIMO). Based on the form and number of an antenna group, the MIMO transmission may be a 2D-MIMO transmission, a 3D-MIMO transmission, an FD-MIMO transmission or a massive-MIMO transmission, or may be a diversity transmission or a pre-coded transmission or a beamforming transmission.

Those skilled in the art shall understand that the embodiments in the present disclosure may be provided as methods, systems, or computer program products. Therefore, the present disclosure may adopt the form of a complete hardware embodiment, a complete software embodiment, or an embodiment combining software with hardware. Further, the present disclosure may adopt a form of a computer program product implemented on one or more computer usable storage media (including but not limited to a disk memory and an optical memory) including a computer usable program code(s).

The present disclosure is described with reference to flowcharts and/or block diagrams of methods, devices (systems), and computer program products according to the embodiments of the present disclosure. It should be understood that each process and/or each block in the flowchart and/or the block diagram, and a combination of the processes and/or the boxes in the flowchart and/or the block diagram, may be implemented by computer-executable instructions. The computer-executable instructions may be provided to a processor of a general-purpose computer, a dedicated computer, an embedded processor, or other programmable data processing devices, to produce a machine such that instructions executed by the processor of the computer or other programmable data processing devices may produce an apparatus for implementing functions specified in one or more processes of the flowchart and/or in one or more boxes of the block diagram.

The processor executable instructions may also be stored in a processor readable memory capable of guiding the computer or the other programmable data processing devices to operate in a particular manner such that the instructions stored in the processor readable memory produce an article of manufacture including an instruction apparatus that implements the function specified in one or more processes of the flowchart and/or in one or more boxes of the block diagram.

The processor executable instructions may also be loaded onto a computer or other programmable data processing devices such that a series of operation steps are performed on the computer or the other programmable devices to produce processes implemented by the computer such that the instructions executed on the computer or the other programmable devices provide steps of functions specified in one or more processes of the flowchart and/or in one or more boxes of the block diagram.

It should be understood that, various forms of procedures shown above may be configured to reorder, add or delete steps. For example, the steps described in the present disclosure may be executed in parallel, sequentially, or in a different order, as long as the desired result of the technical solution disclosed in the present disclosure may be achieved, which will not be limited herein. Those skilled in the art may make various modifications and variations to the disclosure without deviating from the scope of the disclosure. Thus, if these modifications and variations of the disclosure fall within the scope of claims of the disclosure and their equivalents, the disclosure is also intended to include such modifications and variations.

What is claimed is:

1. A method for monitoring a physical downlink control channel (PDCCH), performed by a terminal device, the method comprising:

determining a target monitoring mode of the PDCCH; and determining control-resource sets (CORESETs) to be monitored within an overlapping time domain corresponding to a plurality of monitoring occasions according to the target monitoring mode;

wherein determining the target monitoring mode of the PDCCH comprises:

determining a transmission mode of the PDCCH via at least one of an Radio Resource Control (RRC) signaling or Medium Access Control Control Element (MAC CE) activation information;

in case of the transmission mode of the PDCCH being a single frequency network (SFN) transmission, and at least one of the RRC signaling or a MAC CE signaling being configured with two or more Transmission Configuration Indicator (TCI) states configured with Quasi Co-Location TypeD (QCL-typeD), determining that the target monitoring mode is to monitor the CORESETs to be monitored corresponding to the two or more TCI states configured with OCL-typeD; or in case of the transmission mode of the PDCCH being a single-point transmission, determining that the target monitoring mode is to monitor the CORESETs to be monitored corresponding to one TCI state configured with OCL-typeD.

2. The method according to claim 1, wherein the determining the CORESETs to be monitored within the overlapping time domain according to the target monitoring mode comprises:

determining a first CORESET, and determining the CORESETs to be monitored according to a transmission configuration indicator (TCI) state configuration of the first CORESET.

3. The method according to claim 2, wherein the determining the first CORESET comprises:

determining a CORESET corresponding to a search space set with a lowest index as the first CORESET; or determining, from the CORESETs to be monitored, a CORESET having the two or more TCI states configured with QCL-typeD and corresponding to a search space set with a lowest index, as the first CORESET.

4. The method according to claim 3, wherein the target monitoring mode is to monitor the CORESETs to be monitored corresponding to the one TCI state configured with QCL-typeD, and the method further comprises:

in case of the TCI state configuration of the first CORESET only having one first target TCI state configured with QCL-typeD, determining, from CORESETs other than the first CORESE, a second CORESET having the same first target TCI state as the first CORESET, wherein the CORESETs to be monitored comprise the first CORESET and the second CORESET.

5. The method according to claim 4, further comprising:

in case of the TCI state configuration of the first CORESETCORSET having the two or more TCI states configured with QCL-typeD, determining that the first CORESET may not be served as the CORESET to be monitored;

determining, from the CORESETs other than the first CORESET, a third CORESET having a second target TCI state in the two or more TCI states configured with QCL-typeD and corresponding to the search space set with a lowest index; and determining a fourth CORESET having the same second target TCI state, wherein the CORESETs to be monitored comprise the third CORESET and the fourth CORESET.

6. The method according to claim 4, wherein in case of the TCI state configuration of the first CORESET having the two or more TCI states configured with OCL-typeD, determining that the first CORESET may not be served as the CORESET to be monitored, comprises:

determining a third target TCI state from the two or more TCI states configured with QCL-typeD in the first CORESET; and determining, from the CORESETs other than the first CORESET, a fifth CORESET having the third target TCI state, wherein the CORESETs to be monitored comprise the fifth CORESET.

7. The method according to claim 3, wherein the target monitoring mode is to monitor the CORESETs to be monitored corresponding to the two or more TCI states configured with QCL-typeD, and the method comprises:

in case of the TCI state configuration of the first CORESET only having one fourth target TCI state configured with QCL-typeD, determining, from CORESETs other than the first CORESET, a sixth CORESET having the two or more TCI states configured with QCL-typeD; and determining, from the sixth CORESET, a seventh CORESET having the fourth target TCI state in the two or more TCI states configured with QCL-typeD, wherein the CORESETs to be monitored comprise the first CORESET and the seventh CORESET.

8. The method according to claim 7, further comprising: in case of the TCI state configuration of the first CORESET only having one fifth target TCI state configured with QCL-typeD, determining, from remaining TCI states configured with QCL-typeD, at least one TCI state as a monitored TCI state; and determining, from the CORESETs other than the first CORESET, an eighth CORESET having at least one of the monitored TCI state or the fifth target TCI state, wherein the CORESETs to be monitored comprise the first CORESET and the eighth CORESET.

9. The method according to claim 7, further comprising: in case of the TCI state configuration of the first CORESET having the two or more TCI states configured with QCL-typeD, determining, from the CORESETs other than the first CORESET, a ninth CORESET having at least a part of the two or more TCI states configured with QCL-type, wherein the CORESETs to be monitored comprise the first CORESET and the ninth CORESET.

10. The method according to claim 2, further comprising: finding the first CORESET preferentially according to a lowest index of a common search space (CSS) set, and in case of the first CORESET being not found according to the lowest index of the CSS set, finding the first CORESET according to the lowest index of a user search space (USS) set.

11. The method according to claim 1, wherein determining the target monitoring mode of the PDCCH comprises: receiving transmission configuration information of a single frequency network (SFN) transmission sent by a network device, wherein the transmission configuration information comprises a first radio resource control (RRC) configuration parameter, and determining the target monitoring mode according to the first RRC configuration parameter; or, sending to the network device, a TCI-states monitoring capability within the overlapping time domain corresponding to the plurality of monitoring occasions of the terminal device, receiving a second RRC configuration parameter sent by the network device and indicating to monitor a TCI state configured with QCL-typeD, and determining the target monitoring mode according to the second RRC configuration parameter, wherein the TCI-states monitoring capability is configured to indicate whether the terminal device has a capability for monitoring a CORESET having a plurality of TCI states configured with QCL-typeD; or determining a TCI-states monitoring capability for the terminal device, and determining the target monitoring mode according to the TCI-states monitoring capability.

12. A method for monitoring a physical downlink control channel (PDCCH), performed by a network device, the method comprising:

sending indication information to a terminal device, wherein the indication information is configured to indicate a target monitoring mode corresponding to a PDCCH to the terminal device, and the target monitoring mode is configured to determine control-resource sets (CORESETs) to be monitored within an overlapping time domain corresponding to a plurality of monitoring occasions:

the method further comprising:

indicating a transmission mode of the PDCCH to the terminal device via at least one of an Radio Resource Control (RRC) signaling or Medium Access Control Control Element (MAC CE) signaling;

in case of the transmission mode of the PDCCH being a single frequency network (SFN) transmission, and at least one of the RRC signaling or a MAC CE signaling being configured with two or more Transmission Configuration Indicator (TCI) states configured with Quasi Co-Location TypeD (QCL-typeD), determining that the target monitoring mode is to monitor the CORESETs to be monitored corresponding to the two or more TCI states configured with OCL-typeD; or in case of the transmission mode of the PDCCH being a single-point transmission, the target monitoring mode is to monitor the CORESETs to be monitored corresponding to one TCI state configured with OCL-typeD.

13. The method according to claim 12, wherein the sending the indication information to the terminal device comprises: sending transmission configuration information of a single frequency network (SFN) transmission to the terminal device, wherein the transmission configuration information comprises a first radio resource control (RRC) configuration parameter, and determining the target monitoring mode according to the first RRC configuration parameter; or, receiving a TCI-states monitoring capability within the overlapping time domain corresponding to the plurality of monitoring occasions of the terminal device sent by the terminal device, wherein the TCI-states monitoring capability is configured to indicate whether the terminal device has a capability for monitoring a CORESET having a plurality of TCI states configured with QCL-typeD; or sending a second RRC configuration parameter for indicating to monitor a TCI state configured with QCL-typeD to the terminal device, wherein the second RRC configuration parameter is configured to determine the target monitoring mode.

14. The method according to claim 12, wherein the target monitoring mode is one of: a mode configured to determine the CORESETs to be monitored corresponding to one TCI state configured with QCL-typeD; or a mode configured to determine the CORESETs to be monitored corresponding to two or more TCI states configured with QCL-typeD.

15. The method according to claim 12, further comprising: indicating a transmission mode of the PDCCH to the terminal device via at least one of an RRC signaling or a MAC CE signaling.

16. A terminal device, comprising:

a memory configured to store a computer program, a transceiver configured to transmit and receive data under a control of a processor, and the processor configured to read the computer program stored in the memory and perform operations of: determining a target monitoring mode of the PDCCH; and determining control-resource sets (CORESETs) to be monitored within an overlapping time domain corresponding to a plurality of monitoring occasions according to the target monitoring mode;

wherein determining the target monitoring mode of the PDCCH comprises:

determining a transmission mode of the PDCCH via at least one of an Radio Resource Control (RRC) signaling or Medium Access Control Control Element (MAC CE) activation information;

in case of the transmission mode of the PDCCH being a single frequency network (SFN) transmission, and at least one of the RRC signaling or a MAC CE signaling being configured with two or more Transmission Configuration Indicator (TCI) states configured with Quasi Co-Location TypeD (QCL-typeD), determining that the target monitoring mode is to monitor the CORESETs to be monitored corresponding to the two or more TCI states configured with OCL-typeD; or in case of the transmission mode of the PDCCH being a single-point transmission, determining that the target monitoring mode is to monitor the CORESETs to be monitored corresponding to one TCI state configured with OCL-typeD.

17. The device according to claim 16, wherein the processor is further configured to read the computer program stored in the memory and perform operations of:

determining a first CORESET, and determining the CORESETs to be monitored according to a transmission configuration indicator (TCI) state configuration of the first CORESET; or, determining a CORESET corresponding to a search space set with a lowest index as a first CORESET.

18. The device according to claim 17, wherein the processor is further configured to read the computer program stored in the memory and perform operations of:

determining, from the CORESETs to be monitored, a CORESET having the two or more TCI states configured with QCL-typeD and corresponding to a search space set with a lowest index, as the first CORESET.

19. A network device, comprising: a memory configured to store a computer program, a transceiver configured to transmit and receive data under a control of a processor, and the processor configured to read the computer program stored in the memory and perform the method according to claim 12.

* * * * *